United States Patent
Sugawa et al.

(10) Patent No.: US 9,503,212 B2
(45) Date of Patent: Nov. 22, 2016

(54) STATION-SIDE APPARATUS AND COMMUNICATION METHOD

(71) Applicant: HITACHI, LTD., Tokyo (JP)

(72) Inventors: Jun Sugawa, Tokyo (JP); Toshiyuki Odaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/575,017

(22) Filed: Dec. 18, 2014

(65) Prior Publication Data

US 2015/0229431 A1 Aug. 13, 2015

(30) Foreign Application Priority Data

Feb. 10, 2014 (JP) ................... 2014-023164

(51) Int. Cl.
H04J 14/02 (2006.01)
(52) U.S. Cl.
CPC ........ H04J 14/0282 (2013.01); H04J 14/0257 (2013.01)
(58) Field of Classification Search
CPC ......... H04J 14/0227–14/0252; H04J 14/0282; H04J 14/0286; H04J 14/0257
See application file for complete search history.

(56) References Cited

U.S. PATENT DOCUMENTS

| 2010/0067913 | A1* | 3/2010 | Niibe | H04B 10/70 398/98 |
|---|---|---|---|---|
| 2012/0093502 | A1* | 4/2012 | Gottwald | H04B 10/27 398/27 |
| 2012/0093505 | A1* | 4/2012 | Yeap | H04L 12/2889 398/45 |
| 2012/0106958 | A1* | 5/2012 | Sakamoto | H04J 14/0282 398/58 |
| 2013/0251371 | A1* | 9/2013 | Goodson | H04Q 11/0067 398/66 |
| 2014/0105602 | A1* | 4/2014 | Kawamura | H04L 12/4641 398/66 |
| 2014/0161456 | A1 | 6/2014 | Sugawa et al. | |
| 2015/0063811 | A1* | 3/2015 | Furusawa | H04L 47/6295 398/66 |
| 2015/0326337 | A1* | 11/2015 | Yoshida | H04L 12/44 398/48 |

FOREIGN PATENT DOCUMENTS

JP 2014-116773 A 6/2014
WO 2013/058179 A1 4/2013

OTHER PUBLICATIONS

S. Kimura, 10-Gbits/s TDM-PON and over-40-Gbits/s WDM/TDM-PON systems with OPEX-effective burst-mode technologies, OFC2009, OWH-6, Mar. 2009.
T. Yoshida et al., An automatic load-balancing DWBA algorithm considering long-time tuning devices for λ-tunable WDM/TDM-PON, ECOC2013, We.2.F.5, Sep. 2013.

* cited by examiner

*Primary Examiner* — David Payne
*Assistant Examiner* — Casey Kretzer
(74) *Attorney, Agent, or Firm* — Mattingly & Malur, PC

(57) ABSTRACT

Provided is a station-side apparatus configured to conduct optical communication with a plurality of subscriber apparatuses via a plurality of wavelengths. The station-side apparatus includes a storage apparatus, management information stored in the storage apparatus and configured to indicate whether or not a subscriber apparatus is a first apparatus whose wavelength used for communication is changed to another wavelength, and a transmission unit configured to transmit downlink frames addressed to the plurality of subscriber apparatuses in an order of transmission determined based on the management information.

13 Claims, 13 Drawing Sheets

| 1491 | 1492 | 1493 | 149 |
|---|---|---|---|
| ONU-ID | WAVELENGTH SWITCH TARGET | ACCUMULATED DATA VOLUME | |
| 1 | Yes | 2000 | |
| 2 | No | 30 | |
| ... | ... | ... | |
| N | No | 500 | |

DOWNLINK TRAFFIC MANAGEMENT TABLE

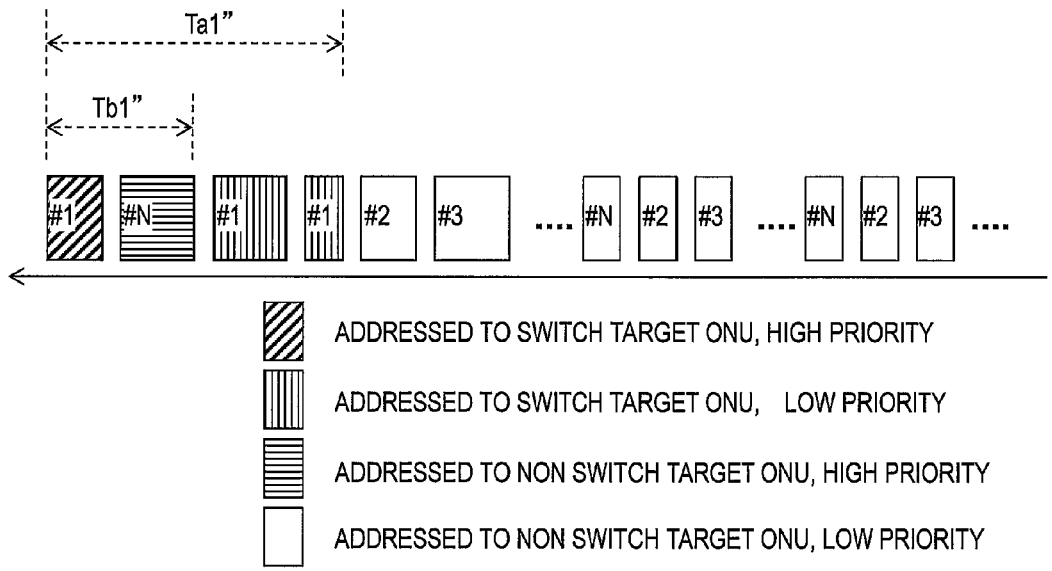
FIG. 14
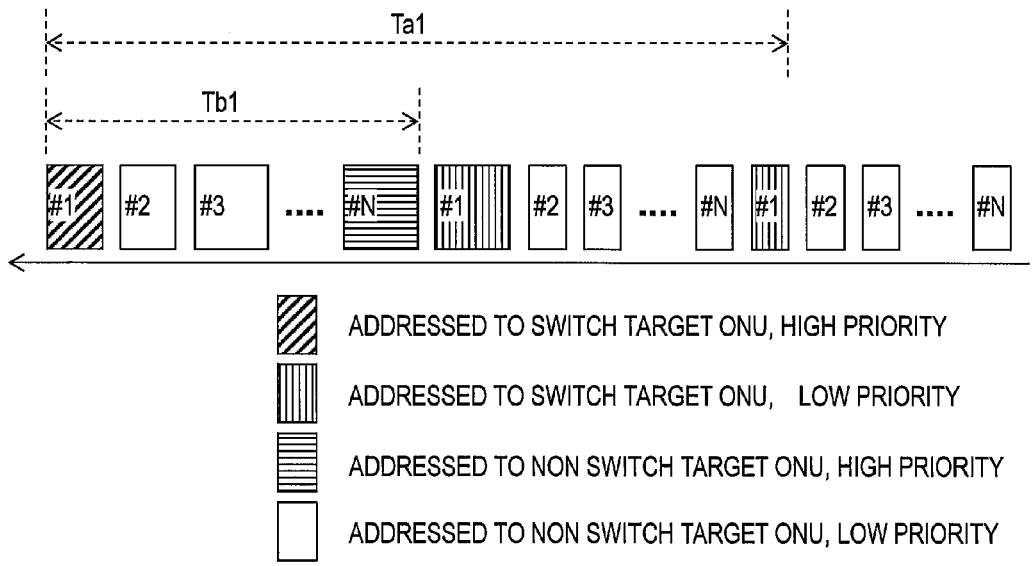
FIG. 15  COMPARATIVE ART

STATION-SIDE APPARATUS AND COMMUNICATION METHOD

CLAIM OF PRIORITY

The present application claims priority from Japanese patent application JP2014-23164 filed on Feb. 10, 2014, the content of which is hereby incorporated by reference into this application.

BACKGROUND

This invention relates to a station-side apparatus. The recent prevalence of the Internet is enhancing the demand for higher-speed network communications. To meet this demand for higher-speed communications, PON (Passive Optical Network) is growing.

The PON is a network system which connects an accommodation station (OLT: Optical Line Terminal) installed in a vendor's station and network units (ONUs: Optical Network Units) installed in user premises; in the PON, the signal in an optical fiber connected to the OLT is split into a plurality of fibers with an optical splitter; the plurality of fibers are connected to the ONUs one by one. When a network is configured with the PON, low cost fiber installation and high-speed communications by employment of optical transmission are attained. For these reasons, the PON is spreading all over the world (refer to WO2013/058179, for example).

Among the techniques utilizing the PON, TDM-PON (Time Division Multiplexing Passive Optical Network) is widely employed, which uses optical signals having different wavelengths in downlink transmission from the OLT to ONUs and uplink transmission from the ONUs to the OLT and further applies time-division multiplexing to the signals depending on the ONU. This TDM-PON is employed in B-PON (Broadband PON), E-PON (Ethernet PON), G-PON (Gigabit-capable PON), 10G-EPON, and XG-PON.

In the TDM-PON, the OLT controls the timing of sending optical signals from ONUs to prevent a conflict among the optical signals from the ONUs in uplink transmission. Specifically, the OLT sends each ONU a control frame to specify a permitted transmission period. Each ONU sends an uplink control signal and uplink data during the period specified by the received control frame.

A candidate of next generation PON is a technique utilizing the WDM/TDM-PON accommodating a plurality of conventional TDM-PONs with a plurality of wavelengths. The WDM/TDM-PON accomplishes a large capacity of communication by utilizing multiple wavelengths.

It is proposed to dynamically change the communication wavelength by using a wavelength-tunable optical transmission reception unit for an ONU in the WDM/TDM-PON in "S. Kimura, "10-Gbit/ s TDM-PON and over-40-Gbit/s WDM/TDM-PON systems with OPEX-effective burst-mode technologies", OFC2009, OWH-6, Mar. 2009". Another technique for switching the wavelength of an ONU is disclosed in "T. Yoshida, et. al, "An automatic load-balancing DWBA algorithm considering long-time tuning devices for λ-tunable WDM/TDM-PON", ECOC2013, We.2.F.5, September 2013". The technique sends a wavelength switching instruction from an OLT to the ONU and receives a wavelength switching completion notice.

SUMMARY

An OLT of a wavelength-tunable WDM/TDM-PON system accumulates downlink frames at a buffer during a period in which wavelength switch is conducted, gives an instruction to an ONU to switch wavelength, and, upon completion of the wavelength switch of the ONU, restarts transmitting downlink frames. By this, the OLT is operable to switch wavelengths without causing a frame loss. A delay time in this context, can be expressed as below.

(downlink delay time)=T3$a$(accumulated frame eviction time)+T3$b$(wavelength switch protocol process time)+T4(transmission time)

Conventionally, downlink traffic control by OLT is executed regardless of the wavelength switch process. Accordingly, since the OLT schedules the transmission of the downlink frames that are addressed to an ONU whose wavelength is to be switched (hereinafter, switch target ONU) and the transmission of the downlink frames that are addressed to non-switch target ONU in an order by assigning substantially the same level of priority thereto, T3$a$, which is the amount of time necessary to evict all the remaining frames that are addressed to the switch target ONU, becomes extended. As a consequence of such scheduling the delay time for the downlink frames addressed to the switch target ONU becomes longer thereby deteriorating the communication quality of such frames.

Accordingly, it is preferable that the downlink frames that are addressed to the switch target ONU and remaining at the OLT are transmitted to corresponding ONUs in a shorter amount time during the process of wavelength switch is ongoing.

In view of such problems, the present invention has been devised, and the objective of the present invention is to swiftly transmit downlink frames that are yet to be transmitted to the switch target ONUs in the wavelength-tunable WDM/TDM-PON system.

An aspect of the present invention is a station-side apparatus configured to conduct optical communication with a plurality of subscriber apparatuses via a plurality of wavelengths, including: a storage apparatus; management information stored in the storage apparatus and configured to indicate whether or not a subscriber apparatus is a first apparatus whose wavelength used for communication is changed to another wavelength; and a transmission unit configured to transmit downlink frames addressed to the plurality of subscriber apparatuses in an order of transmission determined based on the management information.

According to one embodiment of the present invention, it becomes possible to swiftly transmit downlink frames that are yet to be transmitted and are addressed to the switch target ONU.

Objects, configurations, and effects of this invention other than those described above will be clarified in the description of the following embodiments.

BRIEF DESCRIPTION OF THE DRAWINGS

FIG. 14 is an explanatory diagram illustrating downlink frames transmitted from the OSU according to Embodiment 2.

FIG. 15 is an explanatory diagram illustrating a downlink frame transmitted from the OSU according to a comparative example.

DETAILED DESCRIPTION OF THE EMBODIMENTS

Hereinafter, embodiments of the present invention will be described in detail with reference to the drawings. The elements common to the drawings are assigned the same reference signs. The description regarding control frames in a PON section is based on the protocol of 10G-EPON unless otherwise stated.

Figure 1:
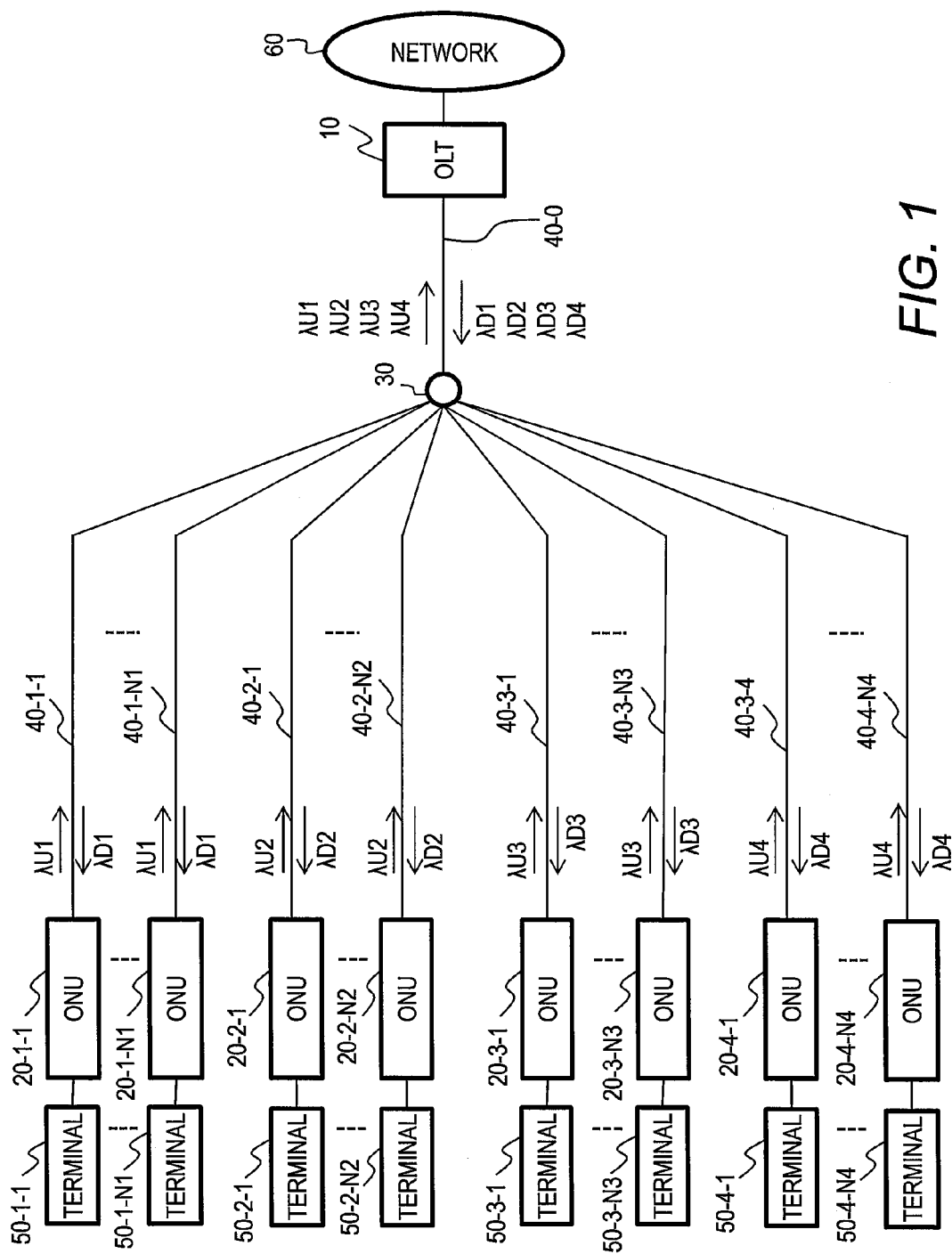
FIG. 1 is a block diagram illustrating an optical access network using a WDM/TDM-PON in Embodiment 1.

FIG. 1 is a block diagram illustrating an optical access network using a WDM/TDM-PON in Embodiment 1.

The optical access network in Embodiment 1 includes an OLT 10, an optical splitter 30, a plurality of ONUs 20 (20-1-1 to 20-4-N4), and a plurality of terminals 50 (50-1-1 to 50-4-N4). The OLT 10 is an optical line terminal and an example of station-side apparatus. The ONU 20 is an optical network unit and an example of subscriber apparatus.

The OLT 10 is connected with the optical splitter 30 via a trunk optical fiber 40-0. The optical splitter 30 is connected with the ONUs 20-1-1 to 20-4-n via branch optical fibers 40-1-1 to 40-4-N. The terminals 50-1-1 to 50-4-N4 are connected with the ONUs 20-1-1 to 20-4-n, respectively.

Next, the downlink transmission and uplink transmission are described as follows. The ONUs 20-1-1 to 20-1-N1 communicate with the OLT 10 using signals having a downlink wavelength $\lambda D1$ and an uplink wavelength $\lambda U1$. The ONUs 20-2-1 to 20-1-N2 communicate with the OLT 10 using signals having a downlink wavelength $\lambda D2$ and an uplink wavelength $\lambda U2$.

The ONUs 20-3-1 to 20-3-N3 communicate with the OLT 10 using signals having a downlink wavelength $\lambda D3$ and an uplink wavelength $\lambda U3$. The ONUs 20-4-1 to 20-4-N4 communicate with the OLT 10 using signals having a downlink wavelength $\lambda D4$ and an uplink wavelength $\lambda U4$. It should be noted that the wavelength for uplink transmission and the wavelength for downlink transmission used by each ONU 20 in the wavelength-tunable WDM/TDM-PON system of this embodiment are determined dynamically.

Next, downlink optical transmission from the OLT 10 to the ONU 20 in the WDM/TDM-PON is described. The OLT 10 sends optical signals addressed to the ONUs 20-1-1 to 20-1-N1 by downlink optical signals having the downlink wavelength $\lambda D1$. The OLT 10 sends optical signals addressed to the ONUs 20-2-1 to 20-2-N2 by downlink optical signals having the downlink wavelength $\lambda D2$.

The OLT 10 sends optical signals addressed to the ONUs 20-3-1 to 20-3-N3 by downlink optical signals having the downlink wavelength $\lambda D3$. The OLT 10 sends optical signals addressed to the ONUs 20-4-1 to 20-1-N4 by downlink optical signals having the downlink wavelength $\lambda D4$.

Thus, an optical signal from the OLT 10 is a wavelength division multiplexed optical signal of optical signals having downlink wavelengths ($\lambda D1$, $\lambda D2$, $\lambda D3$, and $\lambda D4$). The wavelength division multiplexed optical signals are input to the ONUs 20-1-1 to 20-4-N4 via the optical splitter 30 and the optical fibers 40-1-1 to 40-4-N4. Each ONU 20 has a wavelength-tunable optical transmission reception unit that can select wavelengths for transmission and reception, and can send and receive signals having specified wavelengths.

When an ONU 20 receives a wavelength division multiplexed downlink optical signal, it selects and receives only an optical signal having a specified wavelength out of the received downstream optical signal. For example, the ONUs 20-1-1 to 20-1-N1 select only a signal having the downlink wavelength $\lambda D1$ from a wavelength division multiplexed downlink optical signal to receive the selected signal. The ONUs 20-2-1 to 20-2-N2 select only a signal having the downlink wavelength $\lambda D2$ from a wavelength division multiplexed downlink optical signal to receive the selected signal. The ONUs 20-3-1 to 20-3-N3 select only a signal having the downlink wavelength $\lambda D3$ from a wavelength division multiplexed downlink optical signal to receive the selected signal. The ONU 20-4-1 to 20-4-N4 select only a signal having the downlink wavelength $\lambda D4$ from a wavelength division multiplexed downlink optical signal to receive the selected signal.

A downlink optical signal having each downlink wavelength includes time-division multiplexed optical signals for the ONUs 20. For example, the downlink optical signal having the downstream wavelength $\lambda D1$ includes time-division multiplexed optical signals for the ONUs 20-1-1 to 20-1-N1. Each of the ONUs 20 analyzes each frame received from the OLT 10 to determine whether the frame is addressed to itself, and selects and receives only the frames addressed to itself.

Next, uplink transmission from the ONU 20 to the OLT 10 in the WDM/TDM-PON system is described. Each ONU 20 selects one of the upstream wavelengths $\lambda U1$ to $\lambda U4$ and sends an uplink optical signal having the selected wavelength within a period specified by the OLT 10. Since the ONU 20 sends uplink signals only within a specified period, the uplink signals are burst signals.

Specifically, the ONUs 20-1-1 to 20-1-N1 send uplink burst signals having the upstream wavelength $\lambda U1$. The ONUs 20-2-1 to 20-2-N2 send burst signals having the uplink wavelength $\lambda U2$. The ONUs 20-3-1 to 20-3-N3 send uplink burst signals having the uplink wavelength $\lambda U3$. The ONU 20-4-1 to 20-4-N4 send burst signals having the uplink wavelength $\lambda U4$.

The uplink optical signals sent from the ONUs 20 are multiplexed by the optical splitter 30 and fed to the OLT 10. Accordingly, the OLT 10 receives an up uplink optical signal obtained by time-division multiplexed and wavelength division multiplexed up uplink optical signals having up uplink wavelengths $\lambda U1$ to $\lambda U4$.

In this way, the WDM/TDM-PON accommodates a plurality of conventional TDM-PONs with a plurality of wavelengths, so that one OLT can accommodate more ONUs 20 and the WDM/TDM-PON accomplish lager transmission capacity between the OLT 10 and ONUs 20.

Figure 2:
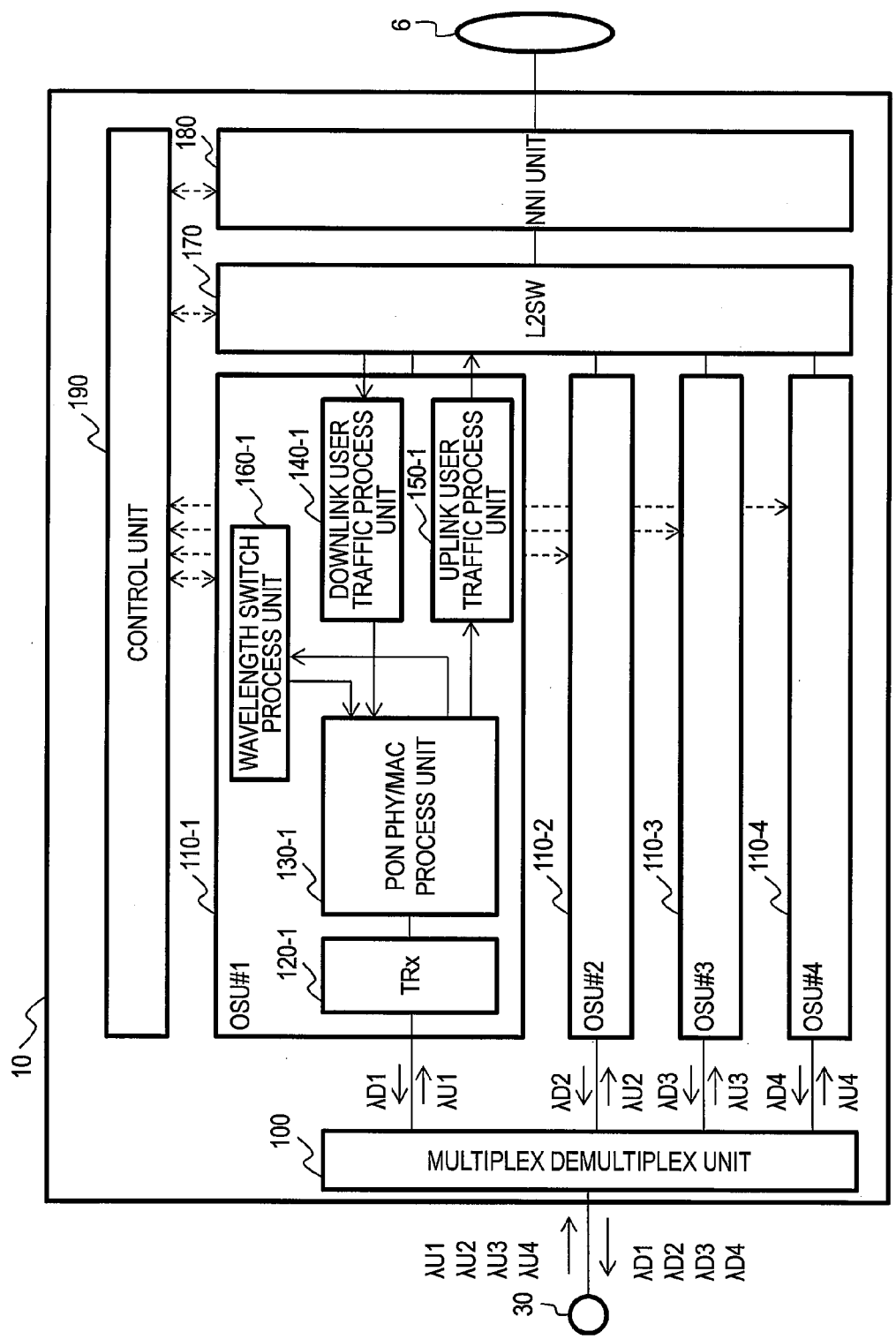
FIG. 2 is a block diagram illustrating a configuration of an OLT according to Embodiment 1.

FIG. 2 is a block diagram illustrating a configuration of an OLT 10 according to Embodiment 1.

The OLT 10 includes a multiplex demultiplex unit (WDM coupler) 100, a plurality of OSUs 110 (110-1 through 110-4), a layer 2 switch (L2SW) 170, a network node interface (NNI) unit 180, and a control unit 190. Each of the OSU 110 (110-1 through 110-4) further includes an optical transmission reception unit (TRx) 120 (120-1 through 120-4), a PON PHY/MAC process unit 130 (130-1 through 130-4), a downlink user traffic process unit 140 (140-1 through 140-4), an uplink user traffic process unit 150 (150-1 through 150-4), and a wavelength switch process unit 160 (160-1 through 160-4) in a corresponding manner.

The multiplex demultiplex unit 100 multiplexes uplink optical signals having wavelengths λU1 through λU4 and downlink optical signals having wavelengths λU1 through λU4, and demultiplexes the same.

The multiplex demultiplex unit 100 multiplexes the optical signal having the downlink wavelength λD1 inputted from the OSU 110-1, the optical signal having the downlink wavelength λD2 inputted from the OSU 110-2, the optical signal having the downlink wavelength λD3 inputted from the OSU 110-3, and the optical signal having the downlink wavelength λD4 inputted from the OSU 110-4, and outputs multiplexed optical signals to the optical splitter 30.

Further, the multiplex demultiplex unit 100 demultiplexes the multiplexed optical signals having the wavelengths λU1 through λU4 inputted from the optical splitter 30. Then, after the demultiplexing, the multiplex unit 100 inputs the optical signal having the uplink wavelength λU1 to the OSU 110-1, inputs the optical signal having the uplink wavelength λU2 to the OSU 110-2, inputs the optical signal having the uplink wavelength λU3 to the OSU 110-3, and inputs the optical signal having the uplink wavelength λU4 to the OSU 110-4.

The optical transmission reception units (TRx) 120-1 through 120-4 each receive the uplink optical signals having the uplink wavelengths λU1 through λU4 inputted from the multiplex demultiplex unit 100 in a corresponding manner, and converts the received uplink optical signal into a current signal. Further, the optical transmission reception units 120-1 through 120-4 each convert and amplify the current signal, which is the result of the conversion of the uplink optical signal, into a voltage signal, and input the electrical signal, which is the result of the conversion and amplification, to the PON PHY/MAC process units 130-1 through 130-4 in a corresponding manner.

Further, the optical transmission reception units 120-1 through 120-4 each convert the electrical signals inputted from the PON PHY/MAC process units 130-1 through 130-4 into the optical signals having the downlink wavelengths λD1 through λD4 in a corresponding manner. Then, the optical transmission reception units 120-1 through 120-4 each output the optical signals, which are the results of the conversion, to the multiplex demultiplex unit 100.

The PON PHY/MAC process unit 130 executes the process of the PHY layer and the MAX layer of a communication in an optical access network section to the received electrical signals. First, the details of the process concerning uplink signals will be described.

The PON PHY/MAC process unit 130 extracts a clock from the electrical signal inputted from the optical transmission reception unit 120. Then, the PON PHY/MAC process unit 130 uses the extracted clock to retime the electrical signal so as to convert the electrical signal into a digital signal.

Further, the PON PHY/MAC process unit 130 executes a decoding process to the digital signal so as to execute an FEC decoding process. Then, the PON PHY/MAC process unit 130 extracts a frame from the digital signal, analyzes the header of the frame, and allocates the frame to a unit in accordance with the type thereof.

To be more specific, when it is determined via the header analysis that the frame includes user data, the PON PHY/MAC process unit 130 outputs the frame to the uplink user traffic process unit 150. Further, when it is determined via the header analysis that the frame includes a frame for wavelength switch control, the PON PHY/MAC process unit 130 outputs the frame to the wavelength switch process unit 160.

Next, the details of the process concerning downlink signals will be described. The PON PHY/MAC process unit 130 attaches to the frame inputted from the downlink user traffic process unit 140 a header corresponding to an optical access section, and executes an FEC encoding process and an encoding process to the frame. Further, the PON PHY/MAC process unit 130 converts the encoded digital signal into an electrical signal, and outputs the electrical signal, which is the result of the conversion, to the optical transmission reception unit 120.

The downlink user traffic process unit 140 queues the MAC frame inputted from the L2SW 170, and executes a bandwidth control, a priority control, and a VLAN operation to the MAC frame in accordance with a prescribed rule. Then, the downlink user traffic process unit 140 outputs the queued MAC frame to the PON PHY/MAC process unit 130.

The uplink user traffic process unit 150 queues the MAC frame inputted from the PON PHY/MAC process unit 130, and executes the bandwidth control, the priority control, and the VLAN operation to the MAC frame in accordance with a prescribed rule. Then the uplink user traffic process unit 150 outputs the queued MAC frame to the L2SW 170.

The wavelength switch process unit 160 is operable to generate control frames for wavelength switch instruction which are transmitted to an ONU 20, and terminate the control frame configured to notify a completion of the wavelength switch (i.e., wavelength switch completion notice) received from the ONU 20.

The layer 2 switch (L2SW) 170 multiplexes the MAC frames inputted from each OSU 110, and outputs the multiplexed MAC frames to the NNI unit 180. Further, the L2SW 170 determines, in accordance with an address of each MAC frame inputted from the NNI unit 180, an output port for each MAC frame. Then, the L2W 170 outputs the MAC frames to the determined port in a corresponding manner.

The NNI unit 180 converts the multiplexed user data frame received from the L2SW 170 into a signal that complies with NNI (Network Node Interface), and outputs the converted user data frame to a network 6. Further, the NNI unit 180 transfers the user data frame inputted from the network 6 to the L2SW 170.

The NNI unit 180 accumulates, in accordance with the instruction from the control unit 190, the downlink user data frame, whose wavelength is to be switched, received during a process of wavelength switch, and transfers the downlink user data frame after the completion of the process of wavelength switch to the L2SW 170. The NNI unit 180 accumulates, in accordance with the instruction from the control unit 190, the downlink user data frame, whose wavelength is to be switched and which is received during a wavelength switch process, and transfers the downlink user data frame after the completion of the wavelength switch process to the L2SW 170.

The control unit 190 is operable to give instructions to the OSUs 110-1 through 110-4, the L2SW 170, and the NNI unit 180, and monitor the status of each unit. For example, the control unit 190 is operable to give wavelength switch instructions to the wavelength switch process unit 160, and detect the wavelength switch process unit 160 receiving the wavelength switch completion notice from the wavelength switch process unit 160.

Further, by updating the values arranged at a management table retained at the downlink user traffic process unit 140, the control unit 190 is operable to switch processes of the downlink user traffic process unit 140, and read the values from the management table.

Further, the control unit 190 is operable to give instructions to the NNI unit 180 to temporarily accumulate frames that are addressed to an object whose wavelength is to be switched, and give instructions to cancel accumulating the frames.

The OLT 10 according to Embodiment 1 is operable to control the wavelength switch process unit 160, the downlink user traffic process unit 140, and the NNI unit 180 arranged at the plurality of OSUs 110 in a coordinated manner.

Figure 3:
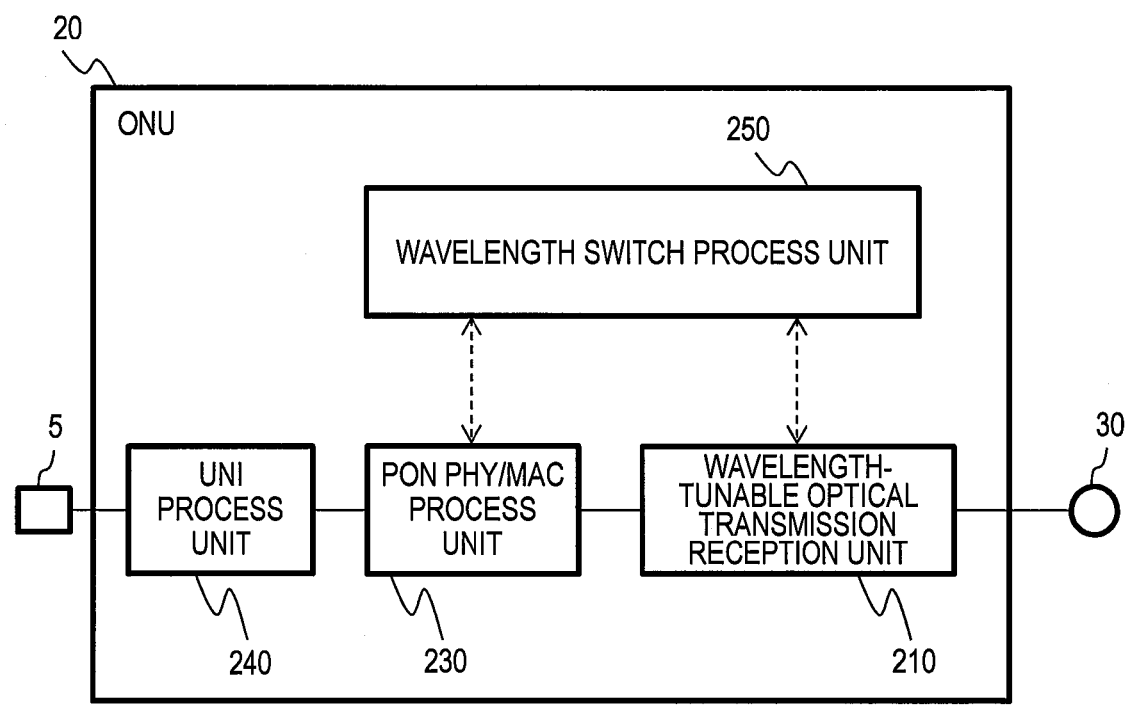
FIG. 3 is a block diagram illustrating a configuration of the ONU according to Embodiment 1.

FIG. 3 is a block diagram illustrating a configuration of the ONU 20 according to Embodiment 1.

The ONU 20 includes a wavelength-tunable optical transmission reception unit 210, a PON PHY/MAC process unit 230, a UNI process unit 240, and a wavelength switch process unit 250.

The wavelength-tunable optical transmission reception unit 210 is an optical transmission reception unit operable to adjust the wavelength (hereinafter, transmission wavelength) transmitted by the ONU 20 and the wavelength (hereinafter, reception wavelength) received by the ONU 20. The wavelength-tunable optical transmission reception unit 210 receives from the wavelength switch process unit 250 instructions to configure the transmission wavelength and reception wavelength.

Then, the wavelength-tunable optical transmission reception unit 210 configures one of the uplink wavelengths λU1 through λU4 to the transmission wavelength of the received uplink optical signal in accordance with the instruction from the wavelength switch process unit 250. Then, the wavelength-tunable optical transmission reception unit 210 transmits the uplink optical signal to the OLT 10. Further, the wavelength-tunable optical transmission reception unit 210 receives, in accordance with the instruction from the wavelength switch process unit 250, a downlink optical signal configured with one of the downlink wavelengths λD1 through λD4.

Here, a process executed by the wavelength-tunable optical transmission reception unit 210 in which the uplink wavelength λU1 is configured to the transmission wavelength and the downlink wavelength λD1 is configured to the reception wavelength will be described. When the wavelength-tunable optical transmission reception unit 210 receives a downlink optical signal, which is a downlink optical signal transmitted from the OLT 10 and on which the downlink wavelengths λD1 through λD4 are multiplexed, the wavelength-tunable optical transmission reception unit 210 cuts wavelengths other than the downlink wavelength λD1.

By this, the wavelength-tunable optical transmission reception unit 210 selects only the downlink optical signal having the downlink wavelength λD1, and receives the selected downlink optical signal. The wavelength-tunable optical transmission reception unit 210 is operable to implement such process by arranging an optical filter operable to change transmission wavelength.

The wavelength-tunable optical transmission reception unit 210 converts the downlink optical signal having the downlink wavelength λD1 into a current signal, and converts the current signal, which is the result of the conversion, into a voltage signal. Further, the wavelength-tunable optical transmission reception unit 210 generates an electrical signal by amplifying the voltage signal. Then, the wavelength-tunable optical transmission reception unit 210 inputs the generated electrical signal to the PON PHY/MAC process unit 230.

Further, the wavelength-tunable optical transmission reception unit 210 converts the electrical signal inputted from the PON PHY/MAC process unit 230 into an uplink optical signal having the uplink wavelength λU1, and outputs the uplink optical signal, which is the result of the conversion, to the OLT 10.

The PON PHY/MAC process unit 230 extracts a clock from the electrical signal inputted from the wavelength-tunable optical transmission reception unit 210. Then, the PON PHY/MAC process unit 230 uses the extracted clock to retime the electrical signal so as to convert the electrical signal into a digital signal.

Further, the PON PHY/MAC process unit 230 executes a decoding process to the digital signal, and extracts a frame from the digital signal. Note that the PON PHY/MAC process unit 230 may further execute the FEC decoding process when necessary prior to extracting the frame from the digital signal. Then, the PON PHY/MAC process unit 230 analyzes the header of the frame so as to determine whether the received frame includes a user data frame or a control frame.

When the received frame includes the user data frame, the PON PHY/MAC process unit 230 outputs the received frame to the UNI process unit 240. When the received frame includes the wavelength switch control frame, the PON PHY/MAC process unit 230 outputs the received frame to the wavelength switch process unit 250.

Further, the PON PHY/MAC process unit 230 multiplexes the user data frame inputted from the UNI process unit 240 and the wavelength switch control frame inputted from the wavelength switch process unit 250, and converts the multiplexed frame into a frame having a header corresponding to an optical access section. Then, the PON PHY/MAC process unit 230 executes an encoding process and the FEC encoding process to the frame, which is the result of the conversion, and outputs the frame to the wavelength-tunable optical transmission reception unit 210.

The UNI process unit 240 converts the user data frame inputted from the PON PHY/MAC process unit 230 into a signal that complies with UNI (User Network Interface), and transmits the frame, which is the result of the conversion, to the terminal 50. Further, the UNI process unit 240 transfers the user data frame transmitted from the terminal 5 to the PON PHY/MAC process unit 230.

Figure 4:
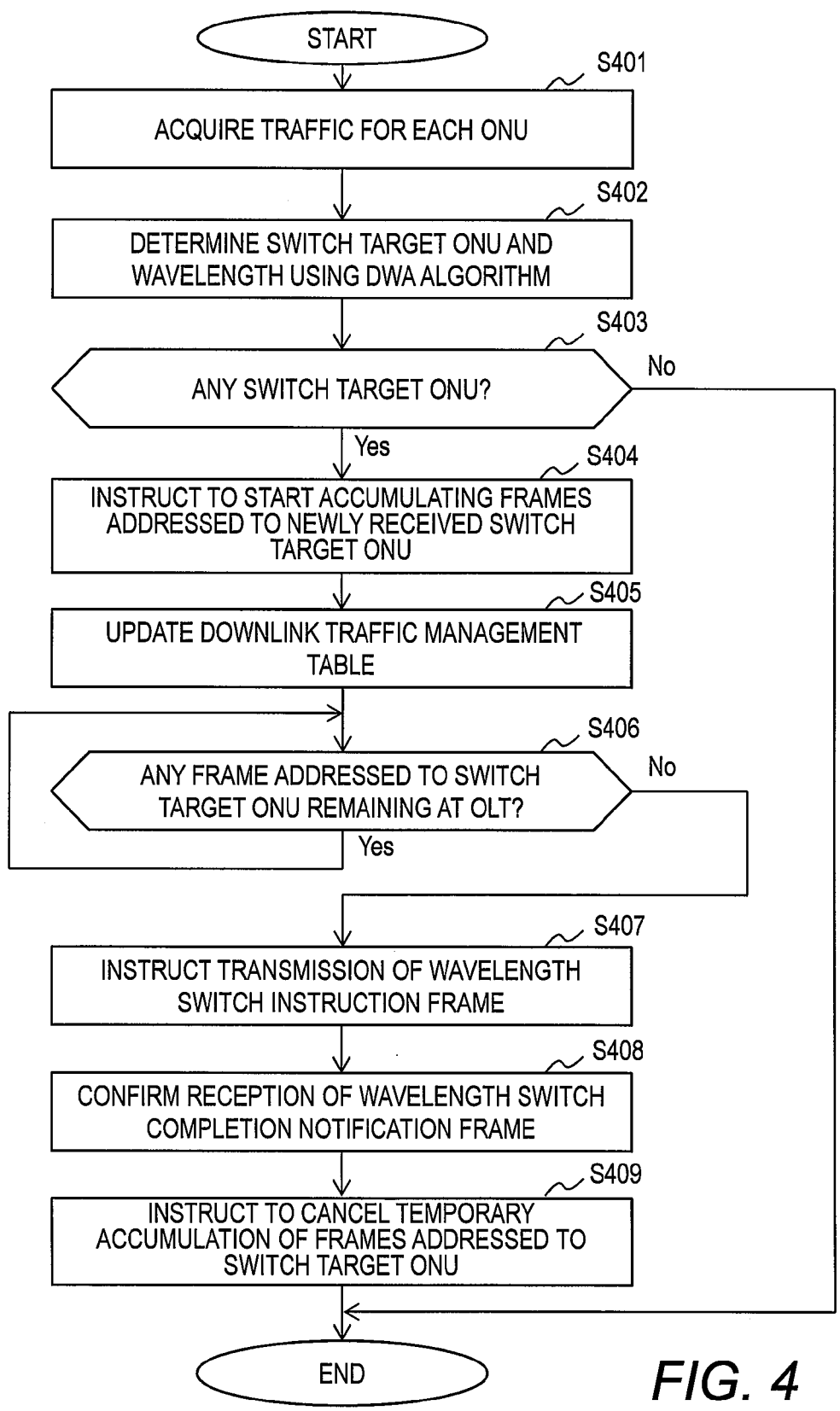
FIG. 4 is a flowchart illustrating a process executed by the control unit according to Embodiment 1

FIG. 4 is a flowchart illustrating a process executed by the control unit 190 according to Embodiment 1.

The process illustrated in FIG. 4 shows the process which includes measuring the traffic of the ONU 20 and the completion of switching wavelengths of the ONU 20. The control unit 190 is operable to execute the process illustrated in FIG. 4 when switching wavelength only one time. Also, the control unit 190 is operable to execute the process illustrated in FIG. 4 when switching wavelength repeatedly in a periodic manner.

After the process illustrated in FIG. 4 has started, the control unit 190 reads the traffic counter (downlink traffic management table 149, which will be described below) in each ONU 20 arranged at each OSU 110. By this, the control unit 190 acquires the traffic volume of each ONU 20 (S401)

Further, in S401, the control unit 190 may calculate an average transfer value by using past traffic volumes, which have already been accumulated, and use the calculated result as the traffic volume.

After S401, the control unit 190 executes a calculation process in order to determine by using a dynamic wavelength allocation algorithm, which the control unit 190 retains, a switch target ONU 20 and the wavelength to be switched to for each ONU 20 (S402). Here, it is to be noted that there are occasions where, after executing the algorithm, no switch target ONU 20 is determined.

The control unit 190 according to the present embodiment uses, for example, a DWA (Dynamic Wavelength Allocation) algorithm as the dynamic wavelength allocation algorithm. The DWA algorithm used in the present embodiment is determined by an administrator who manages the optical access network of the present embodiment, and may include any DWA algorithm.

To be more specific, when the traffic from the multiple ONUs 20 that use the same wavelength becomes excessive, for example, the DWA algorithm may include a method which allocates different wavelengths to the ONUs 20 so as to disperse the traffic. Further, the DWA algorithm may include a method whereby traffic is concentrated to a specific wavelength when the traffic from all the ONUs 20 is relatively slow so as to reduce resource utilization.

After S402, the control unit 190 makes a determination based on the result of the DWA (Dynamic Wavelength Allocation) algorithm calculation as to whether or not there is a switch target ONU 20 (S403). When it is determined there is a switch target ONU 20, the control unit 190 executes S404. When it is determined there is no switch target ONU 20, the control unit 190 ends the process illustrated in FIG. 4.

Note that the control unit 190 according to Embodiment 1 may accept an instruction to switch wavelengths inputted from an administrator via an input/output apparatus connected with the OLT 10. When the control unit 190 receives the instruction to switch wavelengths, the process of S402 will be unnecessary; the control unit 190 will execute S403.

In S404, the control unit 190 gives an instruction to the NNI unit 180 to accumulate frames that are addressed to the switch target ONU 20 out of the frames newly received from a network 60.

After S404, the control unit 190 identifies the OSU 110 which is an accommodating destination of the switch target ONU 20 before a wavelength switch of the switch target ONU 20, and updates the management table (downlink traffic management table 149, which will be described below) of the downlink user traffic process unit 140 of the identified OSU 110 (S405).

As described below, the downlink user traffic process unit 140 executes a traffic process in accordance with the downlink traffic management table 149. Accordingly, the downlink user traffic process unit 140 is operable to switch the processes for the traffic process in a dynamic manner as the control unit 190 updates the downlink traffic management table 149.

Further, since the control unit 190 houses a flag (switch target flag) which indicates the switch target ONU 20 in the downlink traffic management table 149 in S405, the downlink user traffic process unit 140 becomes operable to control the transmission of the frames addressed to the switch target ONU 20 by referring to the newly updated downlink traffic management table 149.

After S405, the control unit 190 makes a determination as to whether or not any frame addressed to the switch target ONU 20 remains at the OSU 110 (S406). To be more specific, in S406, the control unit 190 determines whether or not any frame addressed to the switch target ONU 20 is remaining at the OSU 110 by referring to the downlink traffic management table 149 retained at the downlink user traffic process unit 140 from which the volume of data remaining at a queue for the frames that are addressed to each ONU 20 may be retrieved.

When it is determined that a frame addressed to the switch target ONU 20 is remaining at a downlink queue group 145, the control unit 190 returns to S406. When it is determined that no frame addressed to the switch target ONU 20 is remaining at the downlink queue group 145, the control unit 190 executes S407. By this, after confirming that the OLT 10 has transmitted all the frames addressed to the switch target ONU 20 and that no frames are remaining at the downlink queue group 145, a wavelength switch instruction frame is transmitted, which will be executed in S407. Accordingly, the switch target ONU 20 will not receive its own downlink frame addressed thereto while the wavelength is being switched, and it becomes possible to prevent frame loss of the frames addressed to the ONU 20.

Note that frame losses do not occur when the ONU 20 receives a frame via a pre-switch wavelength until the wavelength switch process has started. Accordingly, another method to prevent the frame loss of the frames addressed to the switch target ONU 20 whose wavelength is to be switched may include that the control unit 190 retains an amount of time (i.e., transmission time) necessary to transmit one frame to the switch target ONU 20, calculates a time at which the transmission of all the frames, which are accumulated at the downlink queue group 145 and addressed to the switch target ONU 20, is completed, and, based on the calculated time, calculates a start time for the wavelength switch included in the wavelength switch instruction frame which is transmitted in S407.

To be more specific, the control unit 190 acquires the volume of the frames which are accumulated at the downlink queue group 145 and are addressed to the switch target ONU 20, and multiplies the acquired volume of the frames by the transmission time so as to calculate the time at which the transmission of all the frames accumulated at the downlink queue group 145 and addressed to the switch target ONU 20 is completed.

Then, the control unit 190 may transmit the wavelength switch instruction frame storing therein the calculated time at which the transmission of all the frames accumulated at the downlink queue group 145 and addressed to the switch target ONU 20 is completed as the time at which the wavelength switch process starts to the OSU 110. By this, the ONU 20 becomes operable to receive frames without any frame loss occurring thereto, and start the wavelength switch process swiftly. Note that the OLT 10 and the ONU 20 are synchronized in advance.

Further, the control unit 190 may receive from an administrator via the input/output apparatus connected with the OLT 10 an amount of time sufficient to complete the transmission of all the frames, which are accumulated at the downlink queue group 145 and are addressed to the switch target ONU 20. Then, the control unit 190 calculates based on the amount of time received from the administrator the time at which the transmission of the frames addressed to the switch target ONU 20 is completed, and stores the calculated time as the time at which the wavelength switch process starts in the wavelength switch instruction frame.

By this, the OLT 10 is operable to reduce the occurrence of frame loss, and start the wavelength switch process swiftly.

In S407, the control unit 190 gives an instruction to the wavelength switch process unit 160 of the OSU 110, which is an accommodating destination of the switch target ONU 20 before the wavelength switch of the switch target ONU 20, to transmit the wavelength switch instruction frame to the switch target ONU 20.

After S407, the control unit 190 confirms as to whether or not a frame including the wavelength switch completion notice from the switch target ONU 20 has been received by monitoring the OSU 110, which is an accommodating destination of the switch target ONU 20 after the wavelength switch of the switch target ONU 20 at a fixed interval (S408). After confirming the reception of the wavelength switch completion notice, the control unit 190 executes S409.

After S408, the control unit 190 gives an instruction to the NNI unit 180 to cancel accumulating the frames addressed to the switch target ONU 20. After the instruction has been given, the control unit 190 ends the process illustrated in FIG. 4.

By the process executed by the control unit 190 above, it becomes possible to switch the downlink traffic processes executed by the OSU 110 after a wavelength switch is decided for the ONU 20 and by the time the wavelength switch instruction is sent.

Figure 5:
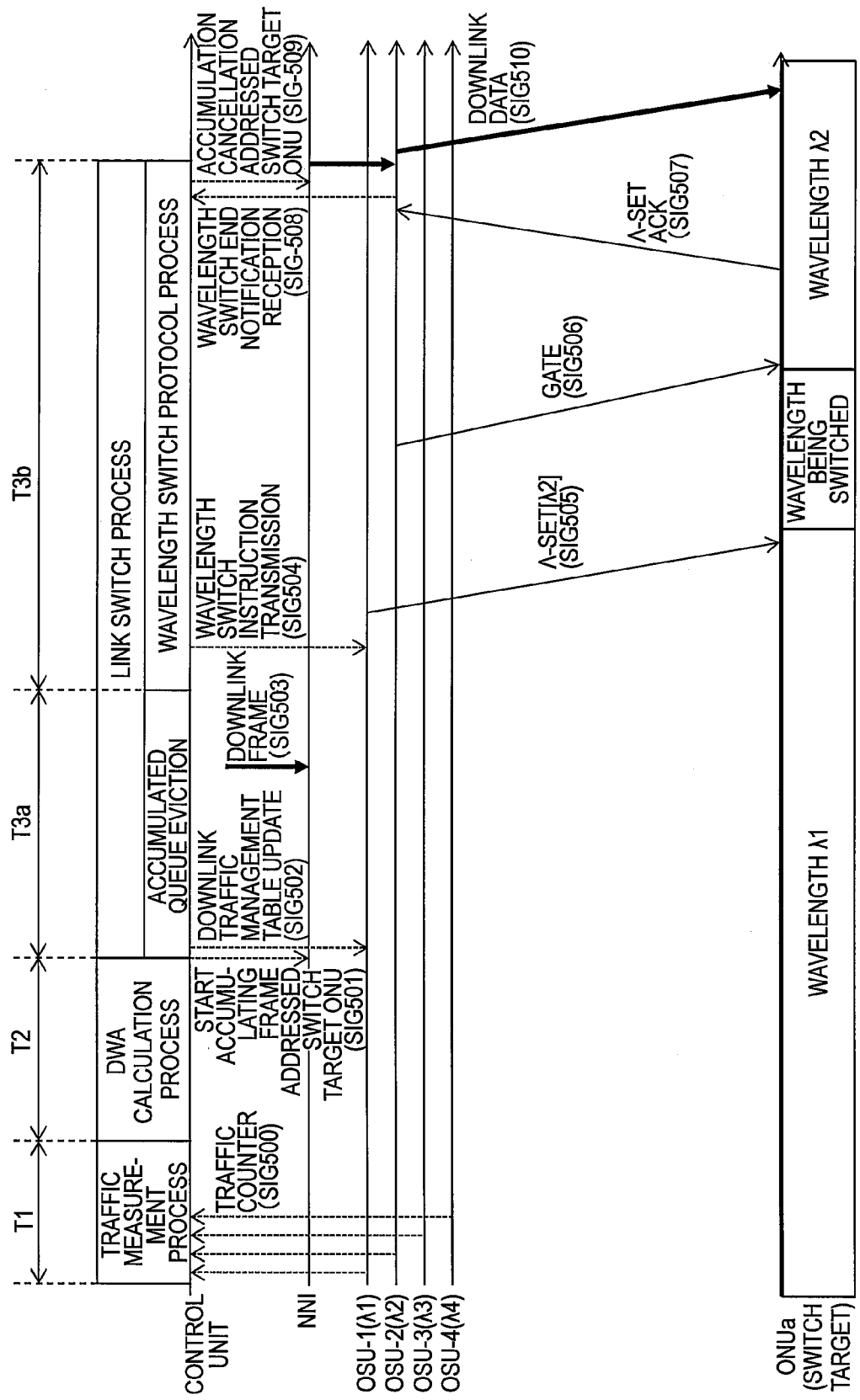
FIG. 5 is a sequence diagram illustrating the wavelength switch process according to Embodiment 1.

FIG. 5 is a sequence diagram illustrating the wavelength switch process according to Embodiment 1.

It is to be noted that while an example in which the wavelength of an ONU 20*a* will be changed from λ1 to λ2 will be described herein, the wavelength may be changed for multiple ONUs 20*a* at the same time. To be more specific, the process illustrated in FIG. 5 may be executed with respect to multiple ONUs 20 in a parallel manner.

First, the control unit 190 acquires the volume of traffic each OSU 110 accommodates from each OSU 110 (SIG500). SIG500 corresponds to S401 illustrated in FIG. 4. In SIG500, the wavelength with which the ONU 20*a* communicates is λ1. Further, the amount of time in which the traffic volume is acquired is indicated by T1.

Next, the control unit 190 executes the calculation process using the DWA algorithm based on the acquired traffic volume so as to determine a switch target ONU 20 and the wavelength to which the switch will be made (corresponding to S402 illustrated in FIG. 4). Here, the ONU 20 which will be determined as the switch target is ONU 20*a,* and the wavelength to which the switch will be made is λ2.

Further, T2 indicates the amount of time in which the switch target ONU 20 is determined by using the DWA algorithm.

After the switch target ONU 20 has been determined, the control unit 190 gives an instruction to the NNI unit 180 to accumulate the frames that are addressed to the switch target ONU 20 (SIG501). SIG501 corresponds to S404 illustrated in FIG. 4. After SIG501, when a downlink frame addressed to the switch target ONU 20 is received (SIG503), the NNI unit 180 continues to buffer the received frame until an instruction to cancel the accumulation of the frames is received from the control unit 190.

The control unit 190 gives an instruction to the OSU 110-1 which accommodates the ONU 20*a,* which is the switch target ONU 20, to update the downlink traffic management table 149 retained at the downlink user traffic process unit 140 and store the switch target flag of the ONU 20*a* (SIG502). SIG502 corresponds to S405 illustrated in FIG. 4.

After SIG501, the downlink user traffic process unit 140 outputs the frames which are accumulated at the queue at the downlink user traffic process unit 140 and are addressed to the ONU 20*a* to the ONU 20*a* so as to evict the frames out of the OSU 110-1. Note, T3*a* indicates the amount of time necessary to evict all the frames which are accumulated at the queue and are addressed to the ONU 20*a*.

When it is determined that the queue for storing the frames that are addressed to the ONU 20*a* has been emptied, the control unit 190 gives an instruction to the OSU 110-1 to transmit the wavelength switch instruction to the ONU 20*a* (SIG504).

When the instruction to transmit the wavelength switch instruction has been received, the OSU 110-1 transmits a λ-SET, which includes a wavelength switch instruction frame, to the ONU 20*a* (SIG505). SIG505 corresponds to S407 illustrated in FIG. 4.

When the ONU 20*a* receives the wavelength switch instruction frame λ-SET, the wavelength-tunable optical transmission reception unit 210 of the ONU 20*a* begins executing a process to switch the wavelength of the signals that are transmitted or received will be the wavelength λ2 as instructed by the wavelength switch instruction frame λ-SET. Note that when the wavelength switch instruction frame includes a time at which the wavelength switch process is scheduled to start, the ONU 20*a* begins the wavelength switch process at the time indicated by the wavelength switch instruction frame.

After the wavelength switch, the ONU 20*a* receives a GATE frame, which is an uplink transmission permit frame, from the OSU 110-2 which communicates via the wavelength λ2 (SIG506).

When the ONU 20*a* receives the GATE frame, the ONU 20*a* transmits a λ-SETACK, which is the wavelength switch completion notice, in order to notify to the OSU 110-2 that the wavelength switch has been completed (SIG507).

When the OSU 110-2 receives the λ-SETACK from the ONU 20*a,* the OSU 110-2 notifies the reception of the wavelength switch completion notice to the control unit 190 (SIG508). SIG508 corresponds to S408 illustrated in FIG. 4.

After SIG508, the control unit 190 gives an instruction to the NNI unit 180 to cancel accumulating the frames that are addressed to the ONU 20*a* (SIG509). By this, the downlink frames which are accumulated at the NNI unit 180 and are addressed to the ONU 20*a* will be evicted from the OSU 110 (SIG510).

T3*b* indicates the amount of time between after all the frames addressed to the ONU 20*a* have been evicted from the downlink user traffic process unit 140 and until the accumulation at the NNI unit 180 is cancelled. T3*b*, in other words, indicates an amount of time required for a protocol process for switching wavelengths.

By the above indicated sequence the OLT 10 temporarily stores the frames, which are addressed to the switch target ONU 20 while the wavelength is being switched and which are yet to be inputted in the OSU 110, and begins transmitting the frames accumulated at the NNI unit 180 after the completion of the wavelength switch for the ONU 20. By this, it becomes possible to switch wavelengths at the ONU 20 without causing any frame losses.

Further, since the control unit 190 updates the downlink traffic management table 149 after the switch target 20 has been determined, and since the downlink user traffic process unit 140 executes the traffic process based on the updated table, it becomes possible to swiftly evict the frames that are addressed to the switch target ONU 20 and reduce the amount of time the frames stay at the OLT 10. Accordingly, it is possible to swiftly start switching wavelengths at the ONU 20.

Figure 6:
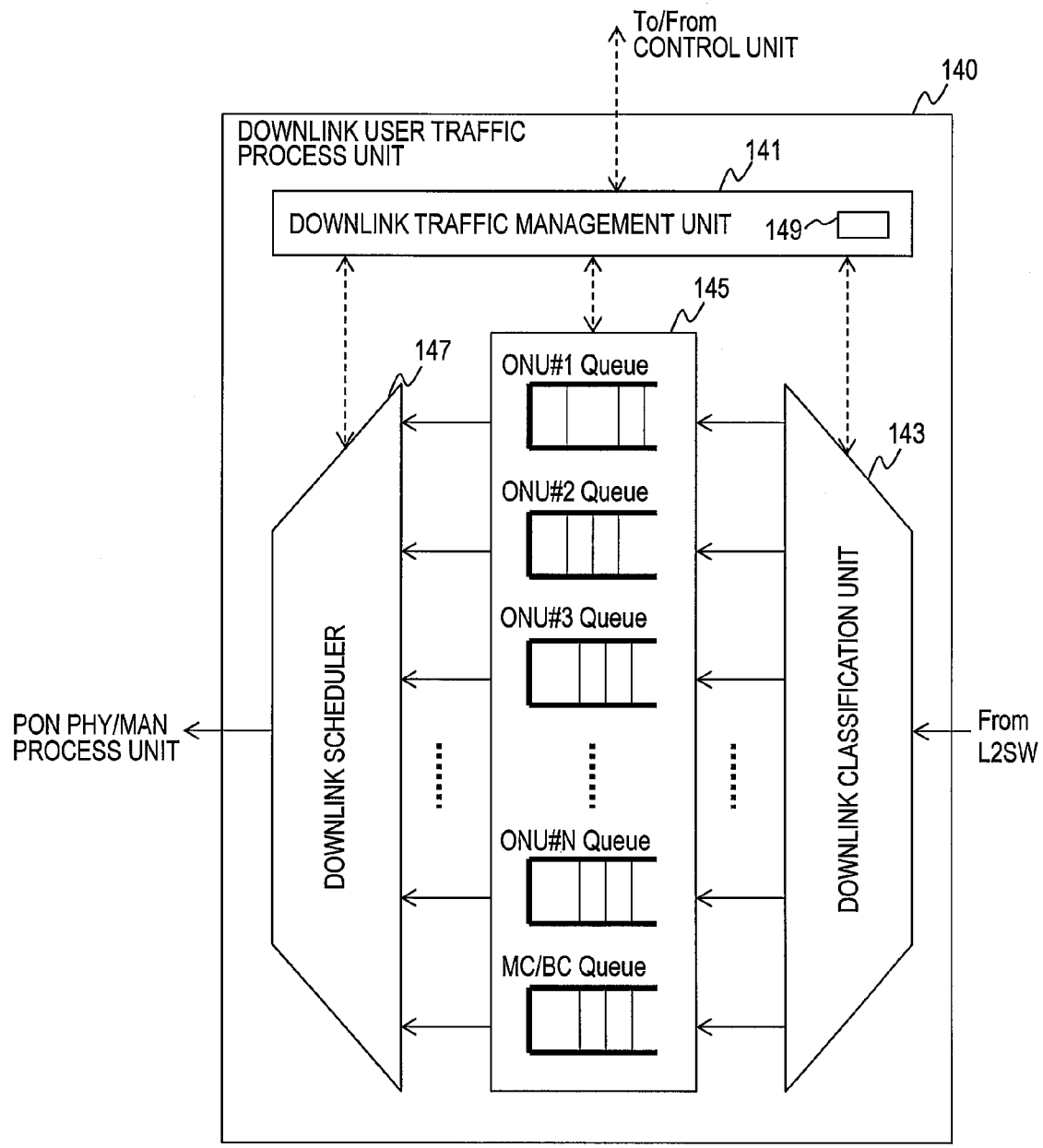
FIG. 6 is a block diagram illustrating a configuration of the downlink user traffic process unit according to Embodiment 1.

FIG. 6 is a block diagram illustrating a configuration of the downlink user traffic process unit 140 according to Embodiment 1.

The downlink user traffic process unit 140 includes a downlink traffic management unit 141, a downlink classification unit 143, the downlink queue group 145, and a downlink scheduler 147.

The downlink traffic management unit 141 manages the status of the queue of each ONU 20.

The downlink traffic management unit 141 includes a memory which retains the downlink traffic management table 149. The downlink traffic management unit 141 monitors the status of a plurality of downlink queues included in the downlink queue group 145 at a fixed interval (or, in accordance with instructions from an administrator), and stores the monitoring results at the downlink traffic management table 149.

Further, the downlink classification unit 143 and the downlink scheduler 147 execute the traffic processes based on the downlink traffic management table 149. Further, the control unit 190 refers to and updates the downlink traffic management table 149.

The downlink classification unit 143 analyzes the header of a frame received from the layer 2 switch (L2SW), allocates the received frame to the destination thereof in accordance with the destination information included in the header, and inputs the frame to the downlink queue group 145. Note that the destination information includes a VLAN-ID and a destination MAC address, for example.

The downlink queue group 145 includes a plurality of queues for unicast frames and a queue for multicast/broadcast (MC/BC). Each of the plurality of queues for unicast frames corresponds to a particular ONU 20. Further, it is to be noted that while FIG. 6 depicts only one queue for multicast/broadcast, the downlink queue group 145 may include 2 queues; a queue for multicast and another queue for broadcast.

The downlink scheduler 147 is configured to determine the volume of data to be read from each queue of the downlink queue group 145 and the order via which the data is read. Then, the downlink scheduler 147 outputs the frames accumulated at the queues in accordance with the determined order to the PON PHY/MAC process unit 130.

Figures 7, 8:
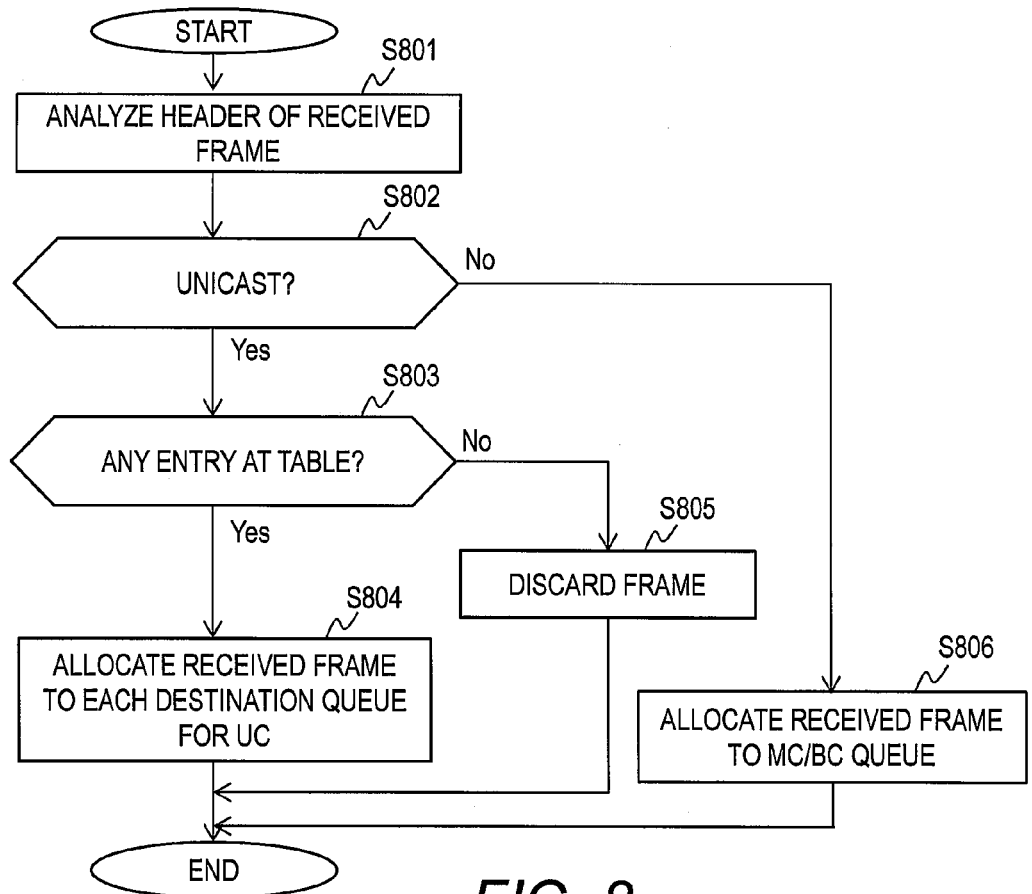
FIG. 7 is an explanatory diagram illustrating an example of the downlink traffic management table according to Embodiment 1.
FIG. 8 is a flowchart illustrating a process executed by the downlink classification unit according to Embodiment 1.

FIG. 7 is an explanatory diagram illustrating an example of the downlink traffic management table 149 according to Embodiment 1.

The downlink traffic management table 149 includes an ONU ID 1491, a wavelength switch target 1492, and an accumulated data volume 1493. The ONU ID 1491 indicates the identifier of the ONU 20.

The wavelength switch target 1492 indicates whether or not the ONU 20 indicated by the ONU ID 1491 is a switch target ONU 20. According to the present embodiment, "Yes" indicated in the wavelength switch target 1492 is the switch target flag indicating the corresponding ONU 20 to be a switch target ONU 20.

The accumulated data volume 1493 indicates the volume of data accumulated at the unicast queue which corresponds to the ONU 20 indicated by the ONU ID 1491.

FIG. 8 is a flowchart illustrating a process executed by the downlink classification unit 143 according to Embodiment 1.

The process illustrated in FIG. 8 is executed one time each time a frame is received.

When the downlink classification unit 143 receives a frame, the downlink classification unit 143 analyzes the header of the received frame (S801). To be more specific, the downlink classification unit 143 acquires from the received frame information (destination information) concerning a destination MAC address and/or a VLAN tag.

After S801, the downlink classification unit 143 makes a determination as to whether or not the destination of the received frame is a unicast based on the destination information acquired in S801 (S802). When it is determined that the destination of the received frame is unicast, the downlink classification unit 143 executes S803. When it is determined that the destination of the received frame is multicast and unicast, the downlink classification unit 143 executes S806.

In S803, the downlink classification unit 143 makes a determination, based on the destination information acquired in S801, as to whether or not it is possible to extract from the table retained at the downlink classification unit 143 an entry which corresponds to the acquired destination information and the identifier of the ONU 20. When it is determined that such entry is extractable, the downlink classification unit 143 executes S804. When it is determined that such entry is unextractable, the downlink classification unit 143 executes S805.

In S804, the downlink classification unit 143 determines a queue to which the frame will be allocated based on the identifier of the ONU 20 which is indicated by the entry extracted in S803. Then, the downlink classification unit 143 allocates the frame to the determined queue. Then, the downlink classification unit 143 ends the process illustrated in FIG. 8.

In S805, the downlink classification unit 143 discards the received frame, and ends the process illustrated in FIG. 8.

In S806, the downlink classification unit 143 allocates the received frame to the MC/BC queue. Then, the downlink classification unit 143 ends the process illustrated in FIG. 8.

By the process illustrated in FIG. 8, the downlink classification unit 143 is operable to allocate the received frame to the queue of the ONU 20 which corresponds to the destination of the received frame.

Figure 9:
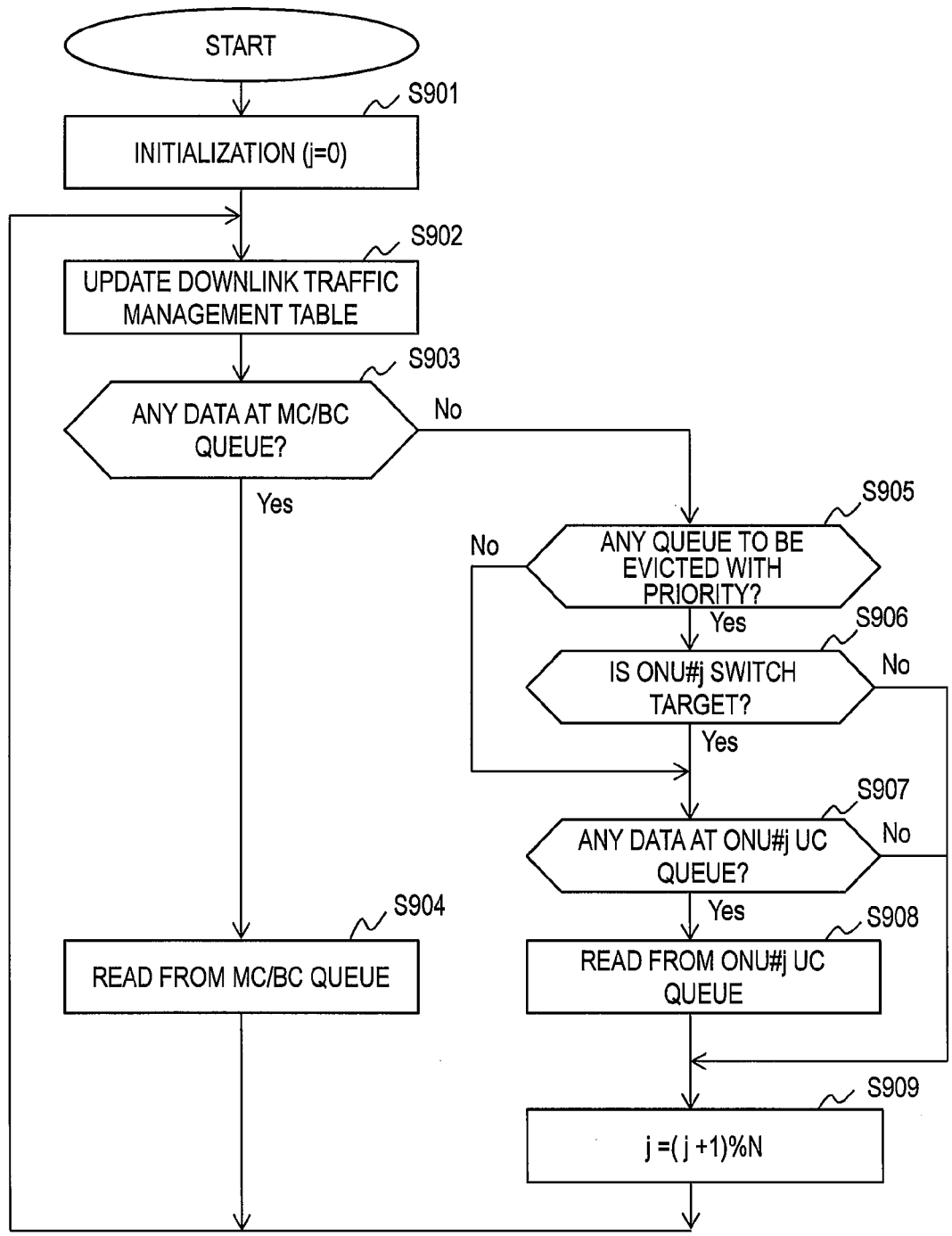
FIG. 9 is a flowchart illustrating a process executed by the downlink scheduler according to Embodiment 1.

FIG. 9 is a flowchart illustrating a process executed by the downlink scheduler 147 according to Embodiment 1.

In the process illustrated in FIG. 9, when a frame is remaining at the MC/BC queue, the downlink scheduler 147 will read with priority the frames stored at the MC/BC queue. Further, when no frame is remaining at the MC/BC queue, the downlink scheduler 147 will read frames from the unicast queue.

Further, note that "j" will be used as an argument to identify each queue corresponding to the ONU 20. Also note that the process illustrated in FIG. 9 may be started when the OLT 10 is activated, or when an administrator gives an instruction to start the process.

The downlink scheduler 147 initializes the process illustrated in FIG. 9 (S901). To be more specific, the downlink scheduler 147 initializes the process by configuring the argument j, which the downlink scheduler 147 retains, to be 0.

After S901, the downlink traffic management unit 141 updates the downlink traffic management table 149. To be more specific, the downlink scheduler 147 acquires from the downlink queue group 145 the volume of data accumulated at each queue of the downlink queue group 145. Then, the downlink scheduler 147 gives an instruction to the downlink traffic management unit 141 to update the accumulated data volume 1493 of the downlink traffic management table 149 in accordance with the acquired volume of data. Further, when the downlink traffic management unit 141 receives an instruction from the control unit 190 on the switch target ONU 20 (corresponding to S405 illustrated in FIG. 4), the downlink traffic management unit 141 updates the wavelength switch target 1492 of the downlink traffic management table 149.

After S902, the downlink scheduler 147 makes a determination as to whether or not data is accumulated at the MC/BC queue (S903). When it is determined that data is accumulated at the MC/BC queue, the downlink scheduler 147 executes S904. When it is determined that no data is accumulated at the MC/BC queue, the downlink scheduler 147 executes, the downlink scheduler 147 executes S905.

In S904, the downlink scheduler 147 reads a frame from the MC/BC queue, and outputs to the PON PHY/MAC process unit 130 the read frame. After S904, the downlink scheduler 147 returns to S902.

In S905, the downlink scheduler 147 makes a determination as to whether or not there is any queue from which frames need to be evicted with priority. To be more specific, the downlink scheduler 147 determines that there is a queue from which a frame needs to be evicted with priority when the downlink traffic management table 149 includes at least one entry in which the wavelength switch target 1492 indicates "Yes" and the accumulated data volume 1493 indicates a positive number, and executes S906.

When it is determined that there is no queue from which a frame needs to be evicted with priority, the downlink scheduler 147 executes S907.

In S906, the downlink scheduler 147 makes a determination as to whether or not an ONU #j is a switch target ONU 20 based on the wavelength switch target 1492 of the downlink traffic management table 149. When it is determined that the ONU #j is a switch target ONU 20, the downlink scheduler 147 executes 5907. When it is determined that the ONU #j is not a switch target ONU 20, the downlink scheduler 147 executes S909.

In S907, the downlink scheduler 147 makes a determination as to whether or not data is accumulated at the unicast queue corresponding to the ONU #j. When it is determined that data is accumulated at the unicast queue, the downlink scheduler 147 executes S908. When it is determined that no data is accumulated at the unicast queue, the downlink scheduler 147 executes S909.

In S908, the downlink scheduler 147 reads frames from the unicast queue corresponding to the ONU #j. Then, the downlink scheduler 147 inputs the read frames to the PON PHY/MAC process unit 130.

After S908, the downlink scheduler 147 adds 1 to j and divides the added value by N so as to calculate the remainder in S909. Then, the downlink scheduler 147 configures the calculated value as a new j. After S909, the downlink scheduler 147 returns to S902.

Note that "N" indicates the total number of the ONU 20.

By the process illustrated in FIG. 9, when a frame that is addressed to the switch target ONU 20 is remaining at the downlink queue group 145 and when an instruction to switch wavelength is given to the switch target ONU 20, the downlink scheduler 147 becomes operable to read with priority the frames addressed to the switch target ONU 20 and transmit the frames to the switch target ONU 20. Further, after there is no more frames addressed to the switch target ONU 20, the downlink scheduler 147 transmits frames that are addressed to non-switch target ONU 20.

By this, the downlink scheduler 147 becomes operable to transmit the frames that are addressed to the switch target ONU 20 with highest priority. Accordingly, it becomes possible to swiftly start the wavelength switch process at the ONU 20.

Note that the process illustrated in FIG. 9 in which the frames addressed to the switch target ONU 20 are transmitted with priority is merely an example of such process and other methods may be applied. For example, the downlink scheduler 147 may secure, by a round robin process scheme, transmission opportunities for transmitting the frames that are addressed to non-switch target ONU 20. The process in which the downlink scheduler 147 reads frames from the downlink queue group 145 by a weighted round robin scheme will be described below.

When it is determined in S907 that data is remaining at the queue of the switch target ONU 20, the downlink scheduler 147 may adjust the ratio at which the downlink scheduler 147 reads frames from the switch target ONU 20 to be greater than the ratio at which the downlink scheduler 147 reads frames from the non-switch target ONU 20 by configuring the weight of the queue of the switch target ONU 20 to be greater than the weight of the queue of the non-switch target ONU 20. Note that the weight of the switch target ONU 20 and the weight of the non-switch target ONU 20 may be configured in advance by an administrator. Further, the weight may be adjusted in accordance with the volume of data remaining at the queues.

Furthermore, the downlink scheduler 147 may adjust the ratio for the number of times of transmission of the frames to the switch target ONU 20 and for the volume of frames transmitted to the switch target ONU 20 to be greater the ratio for the frames that are addressed to the non-switch target ONU 20. In such case, the downlink scheduler 147 transmits frames to the non-switch target ONU 20 even when frames are accumulated at the queue of the switch target ONU 20.

By this, the downlink scheduler 147 is operable to secure transmission opportunity to transmit frames to the non-switch target ONU 20 while being operable to swiftly transmit frames to the switch target ONU 20.

Further, in the process illustrated in FIG. 9, the downlink scheduler 147 reads the frames from the MC/BC queue with higher priority than the frames from the unicast queue, however, the downlink scheduler 147 may read the frames from the unicast queue with higher priority. For example, the downlink scheduler 147 may read frames from, in the order of priority from high to low, the unicast addressed to the switch target ONU, the unicast addressed to the non-switch target ONU 20, and the multicast/broadcast, or read frames from, in the order of priority from high to low, the unicast addressed to the switch target ONU, the multicast/broadcast, and the unicast addressed to the non-switch target ONU 20.

Figure 10:
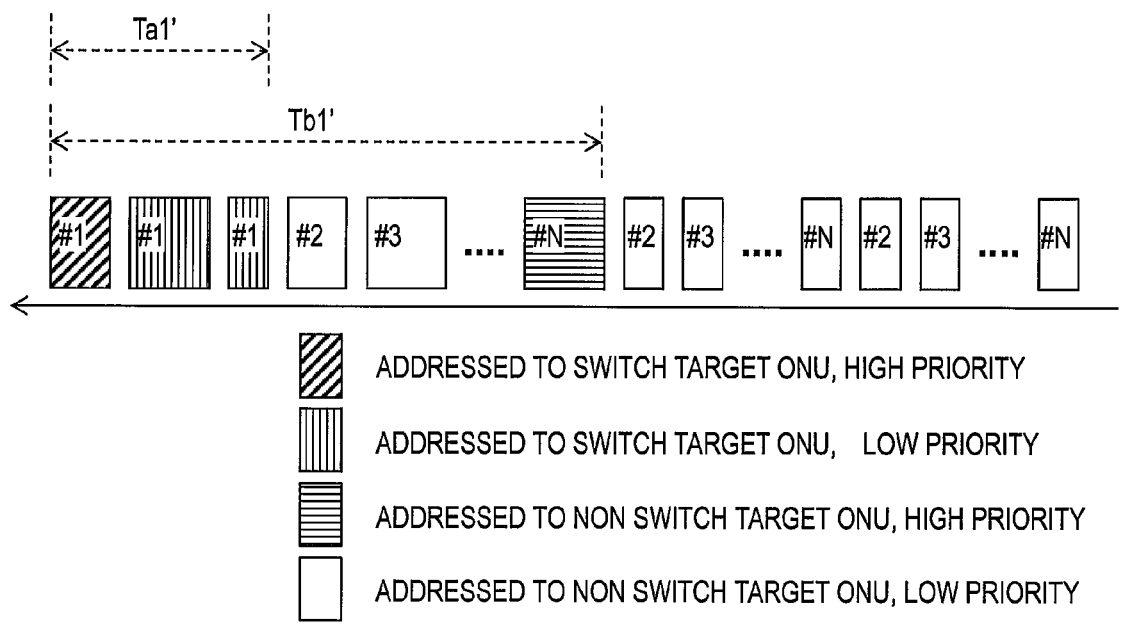
FIG. 10 is an explanatory diagram illustrating downlink frames transmitted from the OSU according to Embodiment 1.

The effect of Embodiment 1 will be described by comparing Embodiment 1 with a comparative example. Note that in the description herein an example will be given in which the volume of the frames addressed to an ONU #1 and the volume of the frames addressed to an ONU #N are substantially equal. Further, note that the ONU #1 illustrated in FIG. 15 and FIG. 10 is the switch target ONU 20.

FIG. 15 is an explanatory diagram illustrating a downlink frame transmitted from the OSU 110 according to a comparative example.

In FIG. 15, each rectangle that is labeled "#1" indicates a frame addressed to the ONU #1. FIG. 15 indicates the frames labeled "#1" are transmitted to the OSU 110 in a fixed interval.

The downlink scheduler 147 according to FIG. 15 reads frames in a round robin scheme from the queue of each ONU 20 irrespective of wavelength switch process. When data is accumulated to each queue of the ONU #1 from the ONU #N, the downlink scheduler 147 begins reading from the frame addressed to ONU #1, then the frame addressed to ONU #2 . . . , and then the frame addressed to ONU #N, respectively.

Since the downlink scheduler 147 reads frames irrespective of switch target ONU 20 or non-switch target ONU 20, an amount of time indicated as "Ta1" will be required for all the frames that are addressed to the ONU #1 are transmitted from the OLT 10.

FIG. 10 is an explanatory diagram illustrating downlink frames transmitted from the OSU 110 according to Embodiment 1.

FIG. 10 illustrates an example in which the frames labeled "#1" are transmitted first with priority from the OSU 110. Since the ONU #1 corresponds to the switch target ONU 20 in FIG. 10, the downlink scheduler 147 according to Embodiment 1 reads the frames addressed to the ONU #1 until the queue includes no more of the frames addressed to the ONU #1.

When data addressed to the ONU #1 no longer exists in the queue, the downlink scheduler 147 according to Embodiment 1 reads the frames accumulated at the queues of the ONU #2 to the ONU #N. Accordingly, an amount of time indicated as Ta1' will be required to transmit all the frames of the ONU #1, which is the switch target ONU 20, from the OSU 110.

According to the diagrams illustrated in FIG. 15 and FIG. 10, Ta1' is smaller than Ta1 (Ta1'<Ta1). Accordingly, the amount of time required to evict the frames which are remaining at the queue and are addressed to the ONU #1 is reduced as a result of the downlink scheduler 147 according to Embodiment 1 reading the frames addressed to the ONU #1 with priority.

Therefore, according to Embodiment 1 since the OLT 10 transmits with priority the frames which are addressed to the switch target ONU 20 prior to the wavelength switch at the ONU 20 and are accumulated at the OSU 110, it becomes possible to reduce the amount of time required to transmit all the frames that are accumulated at the queue of the OSU 110 prior to the wavelength switch. As a result of this, it becomes possible to prevent the wavelength switch process from causing frame losses for the frames that are addressed to the switch target ONU 20, and minimize deterioration of communication quality of the switch target ONU 20. Furthermore, it becomes possible to reduce the amount of time required for the ONU 20 to process the wavelength switch.

Embodiment 2

According to Embodiment 1 of the present invention, the transmission of frames is rescheduled based on whether or not the destination of the frames include a switch target ONU 20 without any consideration for priority of each frame. However, in an environment where high priority traffic, for which minimum delay is expected, is mixed with non-priority traffic, for which longer delays may not cause an issue, executing the process according to Embodiment 1 may cause longer delays for the high priority frame due to processes other than wavelength switch.

Accordingly, the OLT 10 according to Embodiment 2 reschedules the transmission of frames based on the priority of each frame in addition to whether or not the destination of the frame includes a switch target ONU 20. Hereinafter, Embodiment 2 will be described while focusing on the difference between Embodiment 1 and Embodiment 2.

The configurations of the optical access network, the OLT 10, the OSU 110, and the ONU 20 according to Embodiment 2 are the same as those according to Embodiment 1. Further, the process executed by the control unit 190 as illustrated in FIG. 4 and the wavelength switch sequence as illustrated in FIG. 5 will be applied in Embodiment 2 in the same manner as in Embodiment 1.

Figure 11:
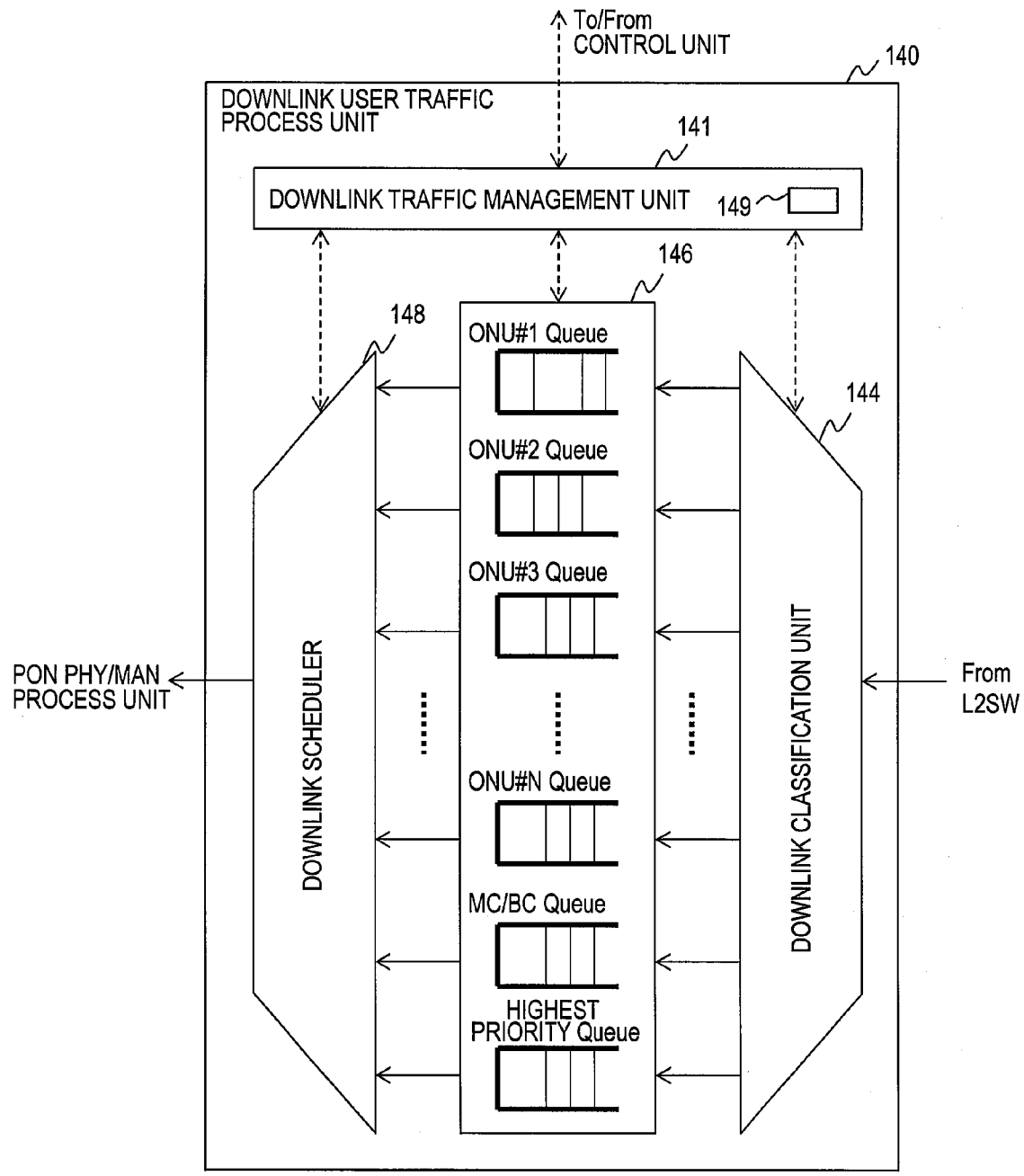
FIG. 11 is a block diagram illustrating a configuration of the downlink user traffic process unit according to Embodiment 2.

FIG. 11 is a block diagram illustrating a configuration of the downlink user traffic process unit 140 according to Embodiment 2.

The downlink user traffic process unit 140 includes the downlink traffic management unit 141, a downlink classification unit 144, a downlink queue group 146, and a downlink scheduler 148.

The downlink traffic management unit 141 according to Embodiment 2 includes the same function as that of the downlink traffic management unit 141 according to Embodiment 1. Further, the downlink traffic management table 149 according to Embodiment 2 includes the same function as the downlink traffic management table 149 according to Embodiment 1.

While the downlink classification unit 144 according to Embodiment 2 includes the same function as the downlink classification unit 143 according to Embodiment 1, difference the downlink classification unit 144 and the downlink classification unit 143 will be described below. The downlink classification unit 144 analyzes the header of a frame received from the L2SW 170 and acquires the destination information and the priority thereof. Then, the downlink classification unit 144 allocates the received frame to a queue based on the acquired destination information and the priority, and outputs the received frame to the downlink queue group 145.

The destination information includes, in the same manner as in Embodiment 1, a VLAN-ID and a destination MAC address, for example. The priority includes a Cos value of a VLAN tag, for example.

Further, the downlink classification unit 144 allocates received frames to the unicast queue, the MC/BC queue, and a highest priority queue of each ONU 20.

The downlink queue group 146 includes the unicast queue and the MC/BC queue in the same manner as in Embodiment 1, and additionally, the highest priority queue. The highest priority queue is a queue in which frames having a priority higher than a predetermined threshold are stored.

While the downlink scheduler 148 according to Embodiment 2 includes the same function as the downlink scheduler 147 according to Embodiment 1, difference between the downlink scheduler 148 and the downlink scheduler 147 will be described below. The downlink scheduler 148 reads a frame from each queue of the downlink queue group 146 based on the priority of the frame and whether or not the frame is addressed to a switch target ONU 20. Then, the downlink scheduler 148 outputs the read frame to the PON PHY/MAC process unit 130.

Figure 12:
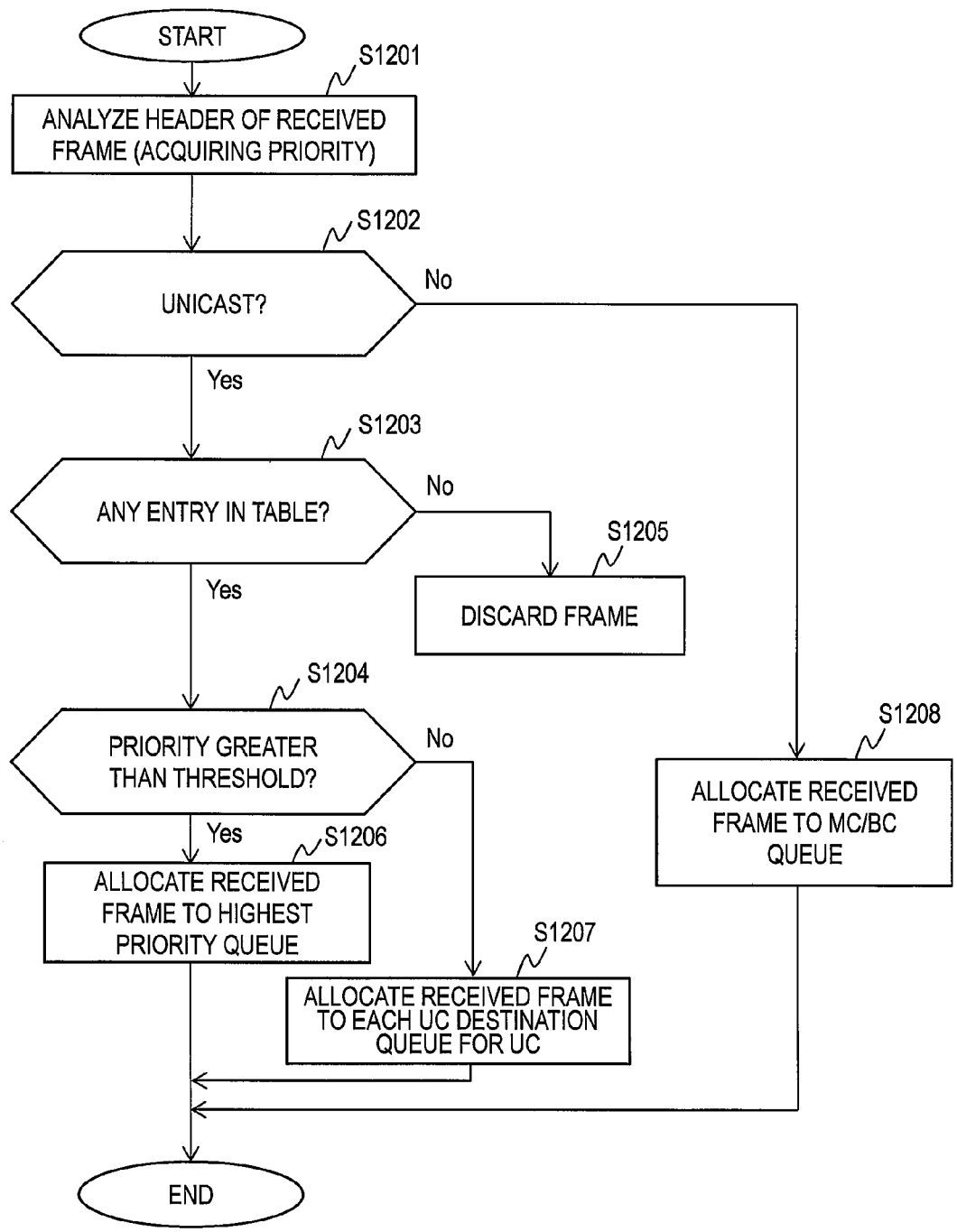
FIG. 12 is a flowchart illustrating a process executed by the downlink classification unit according to Embodiment 2.

FIG. 12 is a flowchart illustrating a process executed by the downlink classification unit 144 according to Embodiment 2.

The downlink classification unit 144 acquires the destination information from a received frame in the same manner as in S801 (S1201). Further, the downlink classification unit 144 acquires the priority (Cos value, or the like) of the frame by analyzing the header of the received frame in S1201. After S1201, the downlink classification unit 144 executes S1202.

Processes executed in S1202, S1203, S1205, and S1208 illustrated in FIG. 12 include the same processes as those executed in S802, S803, S805, and S806 as illustrated in FIG. 8.

When it is determined in S1203 that it is possible to extract from a table retained at the downlink classification unit 143 an entry which corresponds to the acquired destination information and the identifier of the ONU 20, the downlink classification unit 144 compares the priority of the frame acquired in S1201 with a predetermined threshold. Then, the downlink classification unit 144 makes a determination as to whether or not the acquired priority of the frame is greater than the predetermined threshold (S1204).

When it is determined that the priority of the frame is greater than the threshold, the downlink classification unit 144 executes S1206. When it is determined that the priority of the frame is not greater than the threshold, the downlink classification unit 144 executes S1207.

In S1206, the downlink classification unit 144 allocates the received frame to the highest priority queue of the downlink queue group 146, and then, ends the process illustrated in FIG. 12.

Further, in S1207, the unicast queue of the ONU 20, which is the destination of the received frame, is identified based on the entry extracted in S1203, and the received frame is allocated to the identified queue. Then, the downlink classification unit 144 ends the process illustrated in FIG. 12.

By executing the process illustrated in FIG. 12, the downlink classification unit 144 allocates received frames in accordance with the priority of the frames wherein the frames having higher priority are allocated to the highest priority queue while the frames having lower priority are allocated to the unicast queues in accordance with the destination thereof.

Figure 13:
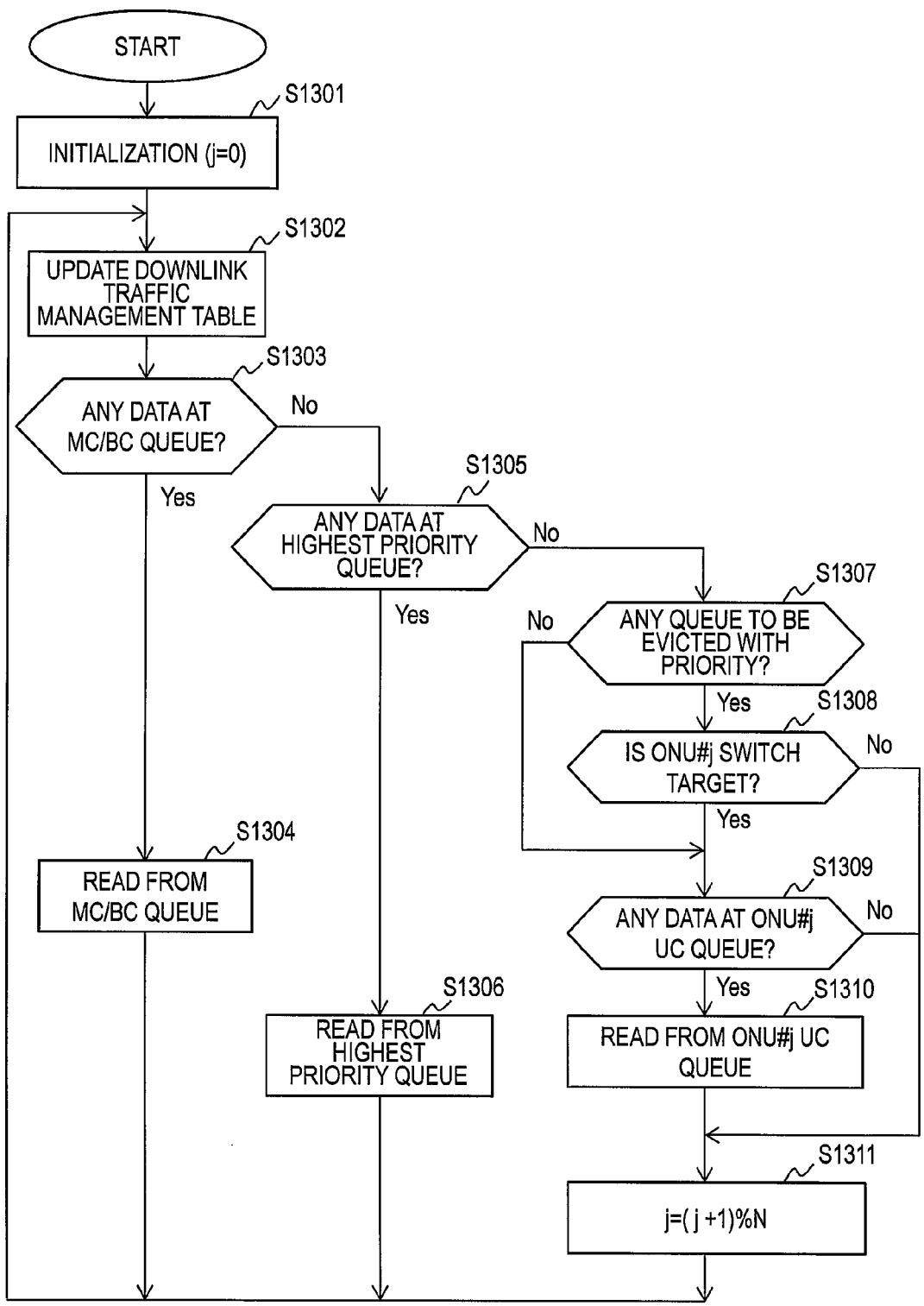
FIG. 13 is a flowchart illustrating a process executed by the downlink scheduler according to Embodiment 2.

FIG. 13 is a flowchart illustrating a process executed by the downlink scheduler 148 according to Embodiment 2.

Note that when frames are remaining at the MC/BC queue, the downlink scheduler 148 according to Embodiment 2 reads with the highest priority the frames remaining at the MC/BC queue. When no frames are remaining at the MC/BC queue, the downlink scheduler 148 reads frames from the highest priority queue. Further, when no frames are remaining at the highest priority queue, the downlink scheduler 148 reads frames from the unicast queue.

Further, in the description below "j" will be used as an argument in order to distinguish each queue corresponding to the ONU 20. The process illustrated in FIG. 13 may be started when the OLT 10 is activated in the same manner as the process illustrated in FIG. 9, or may be started in accordance with an instruction from an administrator.

Note that the processes executed in S1301 through S1304 include the same processes as those in S901 through S904. Further, the processes executed in S1307 through S1311 include the same processes as those in S905 through S909.

In S1303, when it is determined that no data is accumulated at the MC/BC queue, the downlink scheduler 148 makes a determination as to whether or not data is accumulated at the highest priority queue (S1305). In other words, the downlink scheduler 148 makes a determination as to whether or not the highest priority queue includes any frame that needs to be evicted with priority.

When it is determined that data is accumulated at the highest priority queue, the downlink scheduler 148 executes S1306. When it is determined no data is accumulated at the highest priority queue, the downlink scheduler 148 executes S1307.

In S1306, the downlink scheduler 148 reads frames from the highest priority queue, and inputs the read frames to the PON PHY/MAC process unit 130. Then, the downlink scheduler 148 returns to S1302.

By executing the process illustrated in FIG. 13, the OLT 10 becomes operable to transmit with the highest priority frames having the higher priority, and transmit with lesser priority frames that are addressed to the switch target ONU 20.

Note that the method as illustrated in FIG. 13 in which frames having high priority and frames that are addressed to a switch target ONU 20 are transmitted with priority is merely an example of such process and other methods may be applied. For example, when the downlink scheduler 148 reads frames using a weighted round robin scheme and when the highest priority queue includes remaining data, the weight of the highest priority queue may be configured to be greater than the weight of other queues so as to allow the frames from the highest priority queue to be read with priority over other frames in other queues. The weight of the highest priority queue, the weight of the switch target ONU 20, and the weight of non-switch target ONU 20 may be preset or configured by an administrator. Further, the weight of each queue may be determined in accordance with the volume of data remaining at each queue.

Further, the downlink scheduler 148 may prioritize the highest priority queue and the unicast queue over the MC/BC queue to read from the respective queues. For example, the downlink scheduler 148 may read from, in the order of, the highest priority unicast, the MC/BC, the unicast addressed to switch target ONU, and the unicast addressed to non-switch target ONU, respectively. Further, the order via which the downlink scheduler 148 reads may include the highest priority unicast, the unicast addressed to switch target ONU, the MC/BC, and the unicast addressed to non-switch target ONU, respectively.

To be more specific, when it is determined in S1307 that there is no queue from which a frame needs to be evicted with priority, the downlink scheduler 148 executes processes of S1305 and S1306. In this situation, the downlink scheduler 148 executes S1307 after determining in S1303 that no data is accumulated at the MC/BC queue.

The effect of Embodiment 2 will be described by comparing Embodiment 2 with Embodiment 1 and a comparative example.

Here, each unicast queue accumulates therein substantially the same volume of frames addressed to the ONU #1 and to ONU #N. Further, the highest priority queue includes, as high priority frames, frames addressed to the ONU #1 and frames addressed to ONU #N. Further, the ONU #1 queue includes low priority frames. Further, the ONU #1 is the switch target ONU 20.

In Embodiment 1 as illustrated in FIG. 10, since the ONU #1 is the switch target ONU 20, the downlink scheduler 147 reads the frames that are addressed to non-switch target ONU 20 after reading all the frames addressed to the ONU #1. Now, according to Embodiment 1, the amount of time necessary to read the high priority frames addressed to the ONU #1 and the ONU #N is indicated by Tb1'.

Further, according to the comparative example as illustrated in FIG. 15, the downlink scheduler 147 reads the frames addressed to the ONU 20 in an order of the frames. Accordingly, in the comparative example, the amount of time necessary to read the high priority frames addressed to the ONU #1 and the ONU #N is indicated by Tb1.

FIG. 14 is an explanatory diagram illustrating downlink frames transmitted from the OSU 110 according to Embodiment 2.

According to Embodiment 2, the downlink scheduler 148 reads high priority frames with priority. Accordingly, the downlink scheduler 148 reads the high priority frames addressed to the ONU #1 and the ONU #N first, and then the frames that are addressed to the ONU #1 which is the switch target ONU 20.

Accordingly, in Embodiment 2 the amount of time necessary for the downlink scheduler 148 to read the ONU #1 and the ONU #N is indicated by Tb1". Further, according to Embodiment 2 the amount of time necessary for the downlink scheduler 148 to read all the frames addressed to the switch target ONU 20 is indicated by Ta1".

Here, the above stated amounts of time can be expressed as follows: Tb1'>Tb1>Tb1", and Ta1">Ta1">Ta1.

That is, the amount of time necessary to read all the high priority frames according to Embodiment 2 is smaller than that for Embodiment 1 and the comparative example. Further, the amount of time necessary to read the low priority frames addressed to the switch target ONU 20 according to Embodiment 2 is greater than that for Embodiment 1, but is smaller than that for the comparative example.

Therefore, when compared with the comparative example, Embodiment 2 is operable to reduce the amount of time necessary to evict high priority frames and also reduce the amount of time necessary to evict the frames addressed to the switch target ONU 20.

Note that while description herein mentions four types of wavelengths multiplexed between the OLT 10 and the ONU 20, the number of types of wavelengths to be multiplexed only needs to be, according to the present embodiment, greater than two.

The present invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that almost of all components are actually interconnected.

What is claimed is:

1. A station-side apparatus configured to conduct optical communication with a plurality of subscriber apparatuses via a plurality of wavelengths, comprising:
  a storage apparatus that stores management information that indicates whether one of the subscriber apparatuses is a first apparatus whose wavelength used for communication is changed to another wavelength; and
  a transmission unit configured to transmit one or more first downlink frames addressed to one of the plurality of subscriber apparatuses based on an order of the plurality of subscriber apparatuses which is determined based on the management information;
  wherein the transmission unit is configured to, based on the management information, prioritize a transmission of one of the first downlink frames addressed to the first apparatus over a transmission of a plurality of second downlink frames addressed to a second apparatus of the subscriber apparatuses whose wavelength used for communication remains unchanged.

2. The station-side apparatus according to claim 1, further comprising:
  a first storage area configured to accumulate the first downlink frames,
  wherein the transmission unit is configured to, when the first downlink frames addressed to the first apparatus are accumulated at the first storage area, prioritize a transmission of the one of the first downlink frames addressed to the first apparatus over a transmission of one or more of the second downlink frames addressed to the second apparatus whose wavelength used for communication remains unchanged.

3. The station-side apparatus according to claim 2,
  wherein the transmission unit is configured to, when the first downlink frames addressed to the first apparatus are accumulated at the first storage area, transmit the one of the first downlink frames addressed to the first apparatus, and, when there are no first downlink frames addressed to the first apparatus accumulated at the first storage area, transmit one or more of the second downlink frames addressed to the second apparatus.

4. The station-side apparatus according to claim 2,
  wherein the transmission unit is configured to, when the first downlink frames addressed to the first apparatus are accumulated at the first storage area, transmit a greater volume of the first downlink frames addressed to the first apparatus than a volume of the second downlink frames addressed to the second apparatus.

5. The station-side apparatus according to claim 1, further comprising:
  a network interface configured to receive a plurality of downlink frames, including the first downlink frames and the second downlink frames, addressed to the plurality of subscriber apparatuses; and
  a reception unit configured to acquire, from the received downlink frames, a priority of the received downlink frames,
  wherein the transmission unit is configured to transmit the downlink frames addressed to the plurality of subscriber apparatuses in the order based on the management information and the priority of the frames.

6. The station-side apparatus according to claim 5,
  wherein the reception unit is configured to extract a high priority frame having a high priority from the received downlink frames, and
  wherein the transmission unit is configured to prioritize a transmission of the extracted high priority frame over a transmission of the first downlink frames addressed to the first apparatus, and prioritize the transmission of the first downlink frames addressed to the first apparatus over the transmission of the second downlink frames addressed to the second apparatus.

7. The station-side apparatus according to claim 1, further comprising:
a control unit configured to acquire information indicating the first apparatus,
wherein the transmission unit is configured to, before a start time for a wavelength switch of the first apparatus and after acquiring the information indicating the first apparatus, transmit the first downlink frames and the second downlink frames in the order based on the management information.

8. The station-side apparatus according to claim 7, further comprising:
a first storage area configured to accumulate the first downlink frames,
wherein the control unit is configured to determine the start time for a wavelength switch of the first apparatus at a time at which the transmission of the first downlink frames accumulated at the first storage area and addressed to the first apparatus is completed, and
wherein the transmission unit is configured to transmit a wavelength switch instruction frame including the determined start time to the first apparatus.

9. The station-side apparatus according to claim 7,
wherein the control unit is configured to:
receive a time period in which the first downlink frames addressed to the first apparatus are transmitted; and
determine a start time for a wavelength switch of the first apparatus at a time after acquiring information indicating the first apparatus and after the received time period has past, and
wherein the transmission unit is configured to transmit a wavelength switch instruction frame including the determined start time to the first apparatus.

10. A communication method for a station-side apparatus configured to conduct optical communication with a plurality of subscriber apparatuses via a plurality of wavelengths, the method comprising the steps of:
referring to management information that indicates whether the plurality of subscriber apparatuses include a first apparatus whose wavelength used for communication is configured for a switch; and
transmitting one or more first downlink frames addressed to one of the plurality of subscriber apparatuses based on an order of the plurality of subscriber apparatuses which is determined based on the management information;
wherein the step of transmitting prioritizes, based on the management information, transmitting one of the first downlink frames addressed to the first apparatus over transmitting a plurality of second downlink frames addressed to a second apparatus of the subscriber apparatuses whose wavelength used for communication remains unchanged.

11. The communication method according to claim 10,
wherein the station-side apparatus includes a first storage area configured to accumulate the first downlink frames, and
wherein the step of transmitting, when the first downlink frames addressed to the first apparatus are accumulated at the first storage area, prioritizes transmitting the one of the first downlink frames addressed to the first apparatus over transmitting one or more of the second downlink frames addressed to the second apparatus whose wavelength used for communication remains unchanged.

12. The communication method according to claim 11,
wherein the step of transmitting prioritizes transmitting the one of the first downlink frames addressed to the first apparatus over transmitting the second downlink frames addressed to the second apparatus by transmitting, when the first downlink frames addressed to the first apparatus are accumulated at the first storage apparatus, the one of the first downlink frames addressed to the first apparatus, and, when there are no first downlink frames addressed to the first apparatus accumulated at the first storage area, transmitting one or more of the second downlink frames addressed to the second apparatus.

13. The communication method according to claim 11,
wherein, when the first downlink frames addressed to the first apparatus are accumulated at the first storage area, a greater volume of the first downlink frames addressed to the first apparatus are transmitted than a volume of the second downlink frames addressed to the second apparatus.

* * * * *